US012726062B2

(12) United States Patent
Zhang et al.

(10) Patent No.: US 12,726,062 B2

(45) Date of Patent: Sep. 1, 2026

(54) COOLING SYSTEM, STATOR ASSEMBLY, AND AXIAL MAGNETIC FIELD MOTOR

(71) Applicant: SHANGHAI PANGOOD POWER TECHNOLOGY CO., LTD., Shanghai (CN)

(72) Inventors: Guangquan Zhang, Shanghai (CN); Lei Tang, Shanghai (CN); Liang Peng, Shanghai (CN)

(73) Assignee: SHANGHAI PANGOOD POWER TECHNOLOGY CO., LTD, Shanghai (CN)

( * ) Notice: Subject to any disclaimer, the term of this patent is extended or adjusted under 35 U.S.C. 154(b) by 192 days.

(21) Appl. No.: 18/400,968

(22) Filed: Dec. 29, 2023

(65) Prior Publication Data

US 2024/0136876 A1 Apr. 25, 2024
US 2024/0235298 A9 Jul. 11, 2024

Related U.S. Application Data

(63) Continuation of application No. 17/422,424, filed as application No. PCT/CN2019/129106 on Dec. 27, 2019, now Pat. No. 11,942,828.

(30) Foreign Application Priority Data

Jan. 14, 2019 (CN) ........................ 201910031452.9
Jan. 14, 2019 (CN) ........................ 201910031465.6
(Continued)

(51) Int. Cl.
*H02K 1/2795* (2022.01)
*H02K 1/20* (2006.01)
(Continued)

(52) U.S. Cl.
CPC ............ *H02K 1/2795* (2022.01); *H02K 1/20* (2013.01); *H02K 5/203* (2021.01); *H02K 9/19* (2013.01); *H02K 9/197* (2013.01)

(58) Field of Classification Search
CPC .. H02K 1/20; H02K 3/24; H02K 5/20; H02K 5/203; H02K 9/19; H02K 9/197
(Continued)

(56) References Cited

U.S. PATENT DOCUMENTS 3,609,420 A 9/1971 Inagaki et al.
5,519,269 A 5/1996 Lindberg
(Continued)

FOREIGN PATENT DOCUMENTS

CN 102396134 A 3/2012
CN 105576927 A * 5/2016 ............ H02K 21/24
(Continued)

OTHER PUBLICATIONS

U.S. Appl. No. 18/400,968, filed Dec. 16, 2025_CN_105576927_A_H.pdf (Year: 2025).*
(Continued)

*Primary Examiner* — Christopher M Koehler
*Assistant Examiner* — Ahmed F Seck
(74) *Attorney, Agent, or Firm* — Womble Bond Dickinson (US) LLP

(57) ABSTRACT

A cooling system includes a housing. A bottom of the housing has an installation position for installing a stator iron core. The cooling system further includes: an oil inlet cavity and an oil return cavity, an oil inlet and an oil outlet provided on an outer wall of the housing, an oil spraying hole and an oil return hole provided on an inner wall of the housing, and a plurality of oil diverting grooves provided at the bottom of the housing. The oil diverting grooves penetrate through the installation position. A stator component
(Continued)

includes a stator iron core and the cooling system. An axial magnetic field motor includes the stator component.

20 Claims, 14 Drawing Sheets

(30) Foreign Application Priority Data

| | | |
|---|---|---|
| Jan. 14, 2019 | (CN) | 201910031826.7 |
| Mar. 19, 2019 | (CN) | 201910208603.3 |
| Mar. 19, 2019 | (CN) | 201910208629.8 |

(51) Int. Cl.
*H02K 5/20* (2006.01)
*H02K 9/19* (2006.01)
*H02K 9/197* (2006.01)

(58) Field of Classification Search
USPC ............................................. 310/52, 54, 59
See application file for complete search history.

(56) References Cited

U.S. PATENT DOCUMENTS

| | | | | |
|---|---|---|---|---|
| 5,670,838 | A | 9/1997 | Everton | |
| 5,867,953 | A | 2/1999 | Amundsen | |
| 7,009,317 | B2 | 3/2006 | Cronin et al. | |
| 7,397,154 | B2 | 7/2008 | Tilton et al. | |
| 8,129,874 | B2 | 3/2012 | Lambka et al. | |
| 8,692,425 | B2 | 4/2014 | Creviston et al. | |
| 2009/0230788 | A1 | 9/2009 | Kurokawa | |
| 2011/0030969 | A1 | 2/2011 | Richards | |
| 2011/0309699 | A1 * | 12/2011 | Woolmer | H02K 9/197 310/58 |
| 2012/0062055 | A1 | 3/2012 | Murakami et al. | |
| 2014/0125162 | A1 | 5/2014 | Tsuchie | |
| 2014/0175920 | A1 * | 6/2014 | Cimatti | H02K 5/203 310/54 |
| 2017/0004782 | A1 | 1/2017 | Fan et al. | |
| 2018/0048215 | A1 | 2/2018 | Lassila | |
| 2021/0211019 | A1 | 7/2021 | Choi et al. | |
| 2022/0115924 | A1 | 4/2022 | Zhang et al. | |

FOREIGN PATENT DOCUMENTS

| | | | | | |
|---|---|---|---|---|---|
| CN | 106464086 | A | | 2/2017 | |
| CN | 106812606 | A | * | 6/2017 | F02C 7/06 |
| CN | 207234586 | U | | 4/2018 | |
| CN | 108551235 | A | | 9/2018 | |
| CN | 207939351 | U | | 10/2018 | |
| CN | 108900056 | A | | 11/2018 | |
| CN | 109450174 | A | | 3/2019 | |
| CN | 109462311 | A | | 3/2019 | |
| CN | 109474092 | A | | 3/2019 | |
| CN | 109510341 | A | | 3/2019 | |
| CN | 209434977 | U | | 9/2019 | |
| CN | 209435018 | U | | 9/2019 | |
| CN | 209659093 | U | | 11/2019 | |
| CN | 209659094 | U | | 11/2019 | |
| EP | 3028888 | A1 | | 6/2016 | |
| JP | 2010-213412 | A | | 9/2010 | |
| JP | 2015231291 | A | | 12/2015 | |
| JP | 2016093007 | A | | 5/2016 | |
| JP | 2016163373 | A | | 9/2016 | |

OTHER PUBLICATIONS

U.S. Appl. No. 18/400,968, filed Dec. 16, 2025_CN_106812606_A_H.pdf (Year: 2025).*
Chinese Office action for Application No. 201910208603.3, dated Dec. 31, 2024, 12 pages.
European Supplemental Search Report for Application No. 19910377.1, dated Sep. 22, 2022, 17 pages.
International Search Report with English translation and Witten Opinion of corresponding PCT/CN2019/129106, dated Mar. 27, 2020, 14 pages.
Chinese Office action for Application No. 201910031452.9, dated Jan. 17, 2024, 13 pages.
Second Chinese Office for Patent Application No. 201910208603.3, dated Jul. 17, 2025, 14 pages.
Chinese Office action for Application No. 201910208629.8, dated Nov. 23, 2024, 16 pages.

* cited by examiner

COOLING SYSTEM, STATOR ASSEMBLY, AND AXIAL MAGNETIC FIELD MOTOR

CROSS-REFERENCE TO RELATED APPLICATIONS

The present application is a continuation application of U.S. patent application Ser. No. 17/422,424, titled "cooling system, stator assembly, and axial magnetic field motor" and filed on Jul. 12, 2021, which is a National Stage of International Application No. PCT/CN2019/129106, filed on Dec. 26, 2019, which claims the benefit of priorities to the following five Chinese patent applications, all of which are incorporated herein by reference, 1) Chinese Patent Application No. 201910031826.7, titled "COOLING SYSTEM AND MOTOR", filed on Jan. 14, 2019;
2) Chinese Patent Application No. 201910031452.9, titled "COOLING SYSTEM AND MOTOR", filed on Jan. 14, 2019;
3) Chinese Patent Application No. 201910031465.6, titled "STATOR COMPONENT AND AXIAL MAGNETIC FIELD MOTOR", filed on Jan. 14, 2019;
4) Chinese Patent Application No. 201910208629.8, titled "COOLING SYSTEM, STATOR COMPONENT AND AXIAL MAGNETIC FIELD MOTOR", filed on Mar. 19, 2019; and
5) Chinese Patent Application No. 201910208603.3, titled "STATOR COMPONENT AND AXIAL MAGNETIC FIELD MOTOR", filed on Mar. 19, 2019.

FIELD

The present application relates to the technical field of motors, and in particular to a cooling system, a stator component and an axial magnetic field motor.

BACKGROUND

Automobile driving motors in the conventional art have complex operating conditions. Due to the structural characteristics of the motor itself, various losses are generated during the operation of the motor, which causes the motor to generate heat. In order to improve the working efficiency of the motor, it is necessary to design a cooling system for the motor. The cooling system is mainly divided into two types, one is air cooling, and the other is liquid cooling. Compared with air cooling, liquid cooling is more efficient. The existing liquid cooling system mainly adopts an external cooling method, that is, the coolant is in indirect contact with core components to be cooled, and the cooling efficiency is low, which adversely affects the service life of the motor.

SUMMARY

In view of this, a technical problem to be addressed by the present application is to improve the cooling efficiency of a motor and prolong the service life of the motor. Therefore, a cooling system, a stator component and an axial magnetic field motor are provided according to the present application.

In order to achieve the above objects, the following technical solutions are provided according to the present application.

A cooling system for cooling a stator iron core, includes a housing and an enclosed chamber for containing the stator iron core, and further includes:

- a liquid spraying cavity for containing liquid, which is provided on the housing;
- a liquid inlet communicating with the liquid spraying cavity;
- a liquid outlet communicating with the enclosed chamber; and
- a liquid spraying component provided on an inner wall of the housing, which corresponds to the stator iron core.

An axial magnetic field motor includes a stator iron core and a cooling system, where the cooling system is the cooling system according to any one of the above aspects.

A cooling system for cooling a stator iron core, includes a housing and an enclosed chamber for containing the stator iron core, and further includes:

- a liquid spraying cavity for containing liquid, which is provided on the housing;
- a liquid inlet communicating with the liquid spraying cavity;
- a liquid outlet communicating with the enclosed chamber; and
- a liquid spraying hole provided on an inner wall of the housing, which corresponds to the stator iron core.

An axial magnetic field motor includes a stator iron core and a cooling system, where the cooling system is the cooling system according to any one of the above aspects.

A stator component includes a housing and a stator iron core provided inside the housing; where the stator iron core and the housing define a first cooling space, and a middle portion of the stator iron core defines a second cooling space;

- the housing is provided with a liquid inlet cavity and a liquid outlet cavity;
- a liquid inlet communicating with the liquid inlet cavity and a liquid outlet communicating with the liquid outlet cavity are provided on an outer wall of the housing;
- a first intermediate liquid port communicating with the liquid inlet cavity and a second intermediate liquid port communicating with the liquid outlet cavity are provided on an inner wall of the housing; and
- multiple cooling passages are provided on the stator iron core, and the first cooling space and the second cooling space are communicated with each other through the cooling passages.

An axial magnetic field motor includes the stator component according to any one of the above aspects.

A cooling system includes a housing, where a bottom of the housing has an installation position for installing a stator iron core. The cooling system further includes:

- an oil inlet cavity and an oil return cavity, which are provided in the housing;
- an oil inlet and an oil outlet, which are provided on an outer wall of the housing, where the oil inlet is communicated with the oil inlet cavity, and the oil outlet is communicated with the oil return cavity;
- an oil spraying hole and an oil return hole, which are provided on an inner wall of the housing, where the oil spraying hole is communicated with the oil inlet cavity, and the oil return hole is communicated with the oil return cavity; and
- multiple oil diverting grooves provided at the bottom of the housing, where the oil diverting grooves penetrate through the installation position.

A stator component includes a stator iron core and the cooling system according to any one of the above aspects, where the stator iron core is provided on an installation position of the housing of the cooling system; where an outer ring of the stator iron core and the housing define a first cooling space, and an inner ring of the stator iron core and the housing define a second cooling space.

An axial magnetic field motor includes the stator component according to any one of the above aspects.

A stator component includes a housing, a stator iron core, a coil, a pole shoe, and a stator cover plate, where the stator iron core, the coil and the pole shoe are provided in a space defined by the housing and the stator cover plate; where the coil is provided in an open slot of the stator iron core, the pole shoe is fixed on the stator cover plate, and when the stator cover plate is butted with the housing, the pole shoe can be arranged at a notch of the open slot; an outer ring of the stator iron core and the housing define a first cooling space, and an inner ring of the stator iron core and the housing define a second cooling space communicating with the first cooling space;

a housing wall of the housing is provided with an oil inlet cavity and an oil return cavity, and an outer wall of the housing is provided with an oil inlet and an oil outlet; where the oil inlet is communicated with the oil inlet cavity, and the oil outlet is communicated with the oil return cavity; an inner wall of the housing is provided with an oil spraying hole and an oil return hole, and the first cooling space and the oil inlet cavity are communicated with each other through the oil spraying hole, and the first cooling space and the oil return cavity are communicated with each other through the oil return hole.

An axial magnetic field motor includes the stator component according to any one of the above aspects.

It can be seen from the above technical solutions that, when adopting the cooling system of the present application, liquid enters the liquid spraying cavity from the liquid inlet, and the liquid is sprayed to the stator iron core located in the enclosed chamber through the liquid spraying hole. After the liquid sprayed from the liquid spraying hole exchanges heat with the stator iron core, it flows out from the liquid outlet. Compared with the conventional art, the circulating liquid directly contacts the stator iron core to exchange heat, thereby improving the cooling efficiency of the motor and prolonging the service life of the motor.

BRIEF DESCRIPTION OF THE DRAWINGS

In order to illustrate technical solutions in the embodiments of the present application or in the conventional technology more clearly, drawings used in the description of the embodiments or the conventional technology are introduced briefly hereinafter. Apparently, the drawings described hereinafter merely illustrate some embodiments of the present application, and other drawings may be obtained by those skilled in the art based on these drawings without any creative efforts.

Figure 1:
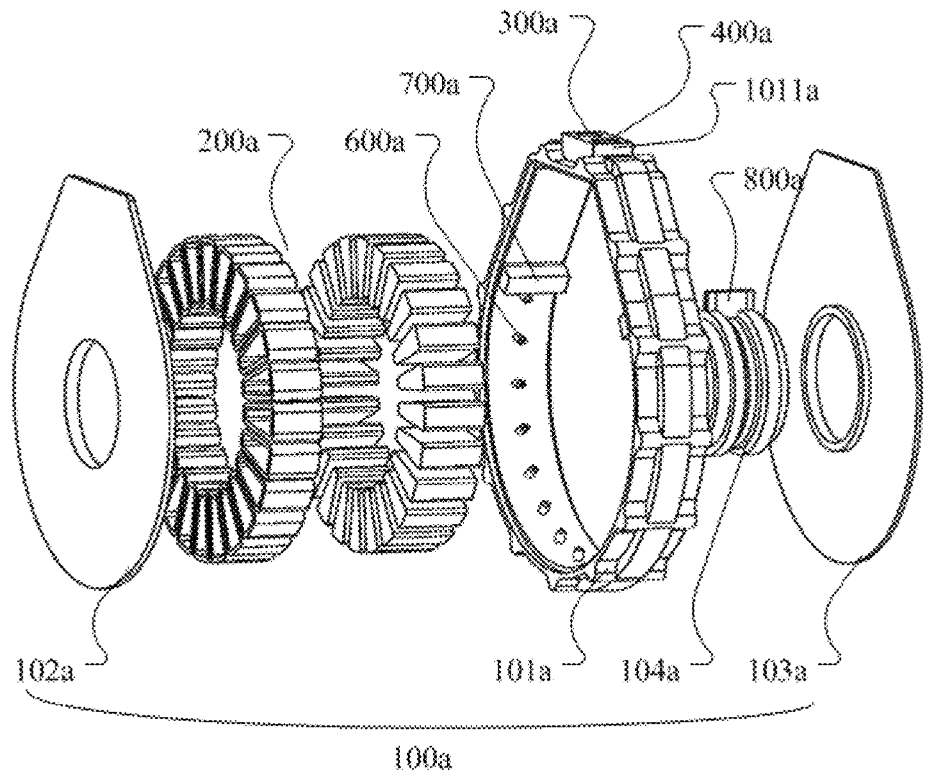
FIG. 1 is a schematic exploded view showing the structure of a cooling system provided by a first embodiment of the present application.
Figure 2:
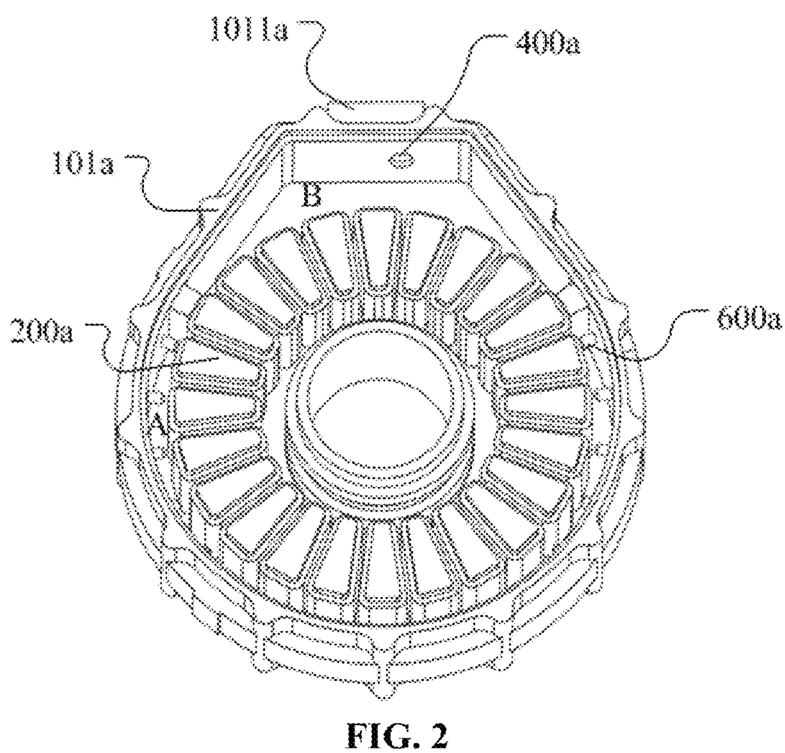
FIG. 2 is a schematic perspective view showing the structure of the cooling system provided by the first embodiment of the present application.

| Reference numerals in the FIGS., | |
|---|---|
| 100a housing; | 200a stator iron core; |
| 300a liquid inlet; | 400a liquid outlet; |
| 500a liquid spraying cavity; | 600a liquid spraying component; |
| 700a first spoiler; | 800a second spoiler; |
| 101a stator casing; | 102a upper cover plate; |
| 103a lower cover plate; | 104a intermediate shaft sleeve; |
| 1011a external port; | |

Figure 5:
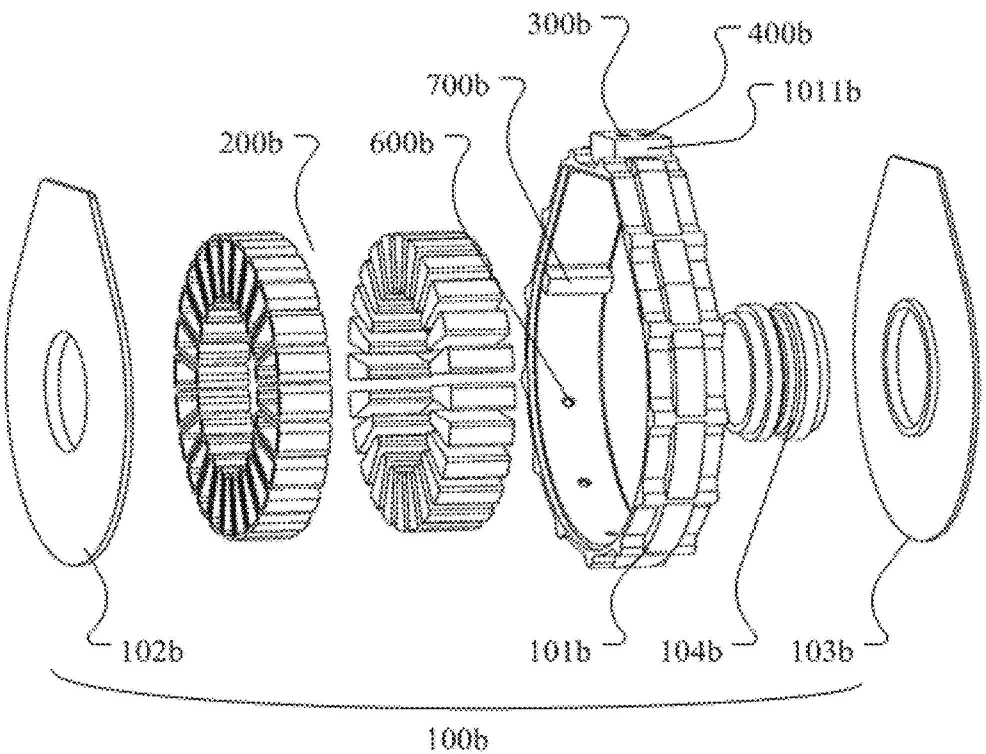
Figure 6:
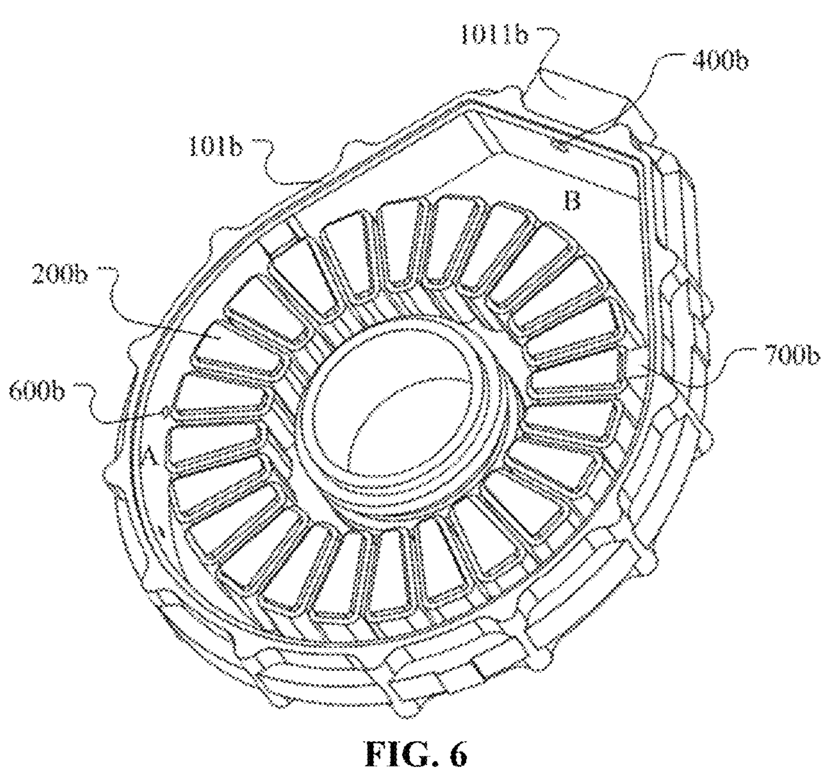
Figure 7:
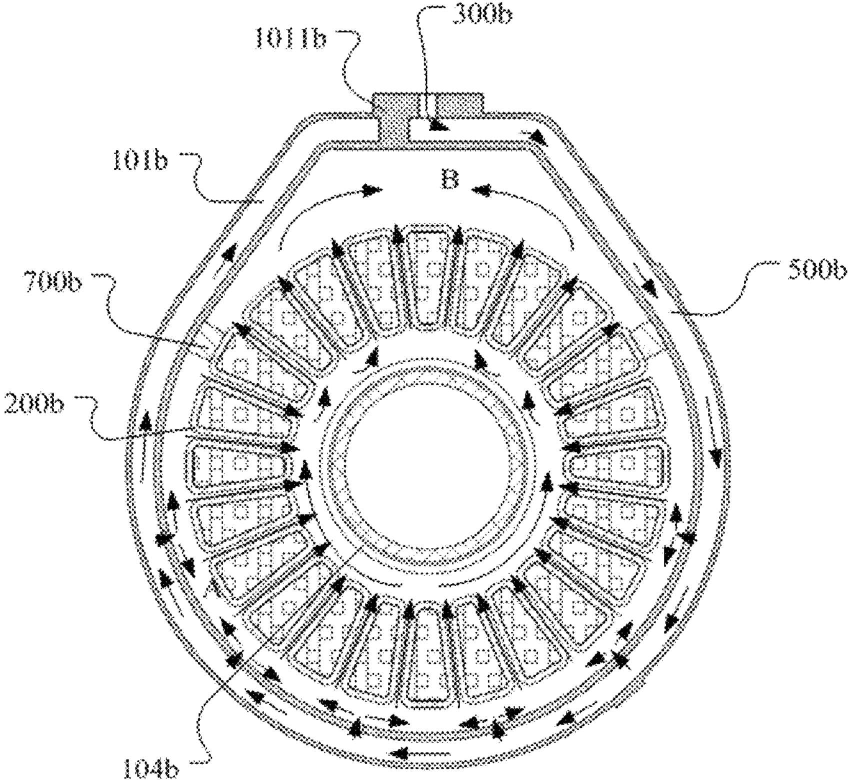
Figure 8:
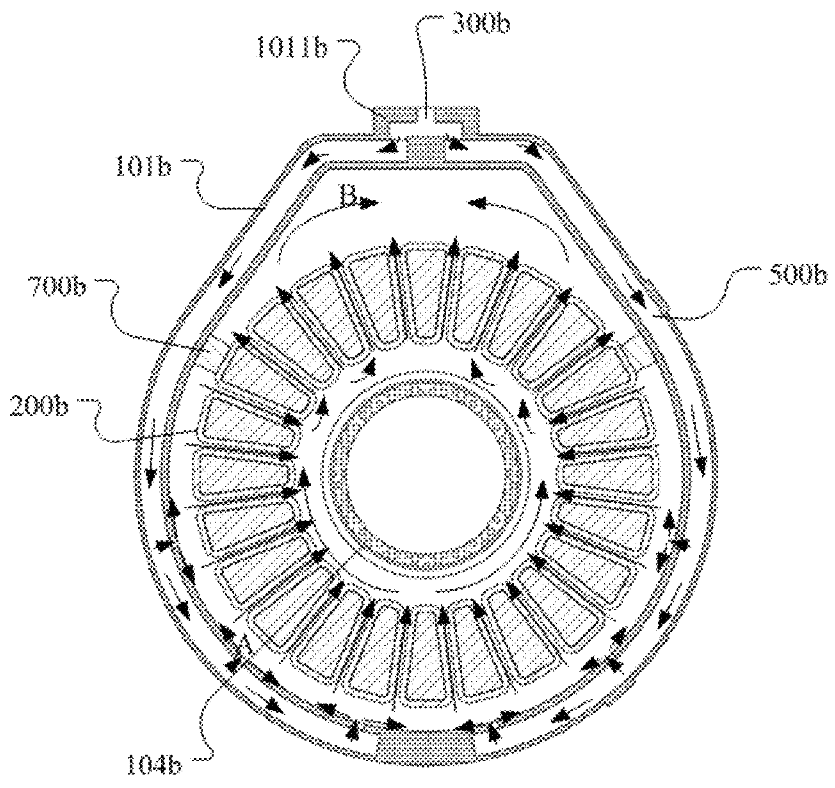

FIG. 5 is a schematic exploded view showing the structure of a cooling system provided by a second embodiment of the present application;

FIG. 6 is a schematic perspective view showing the structure of the cooling system provided by the second embodiment of the present application;

FIG. 7 is a schematic diagram of a principle of the cooling system provided by the second embodiment of the present application;

FIG. 8 is a schematic diagram of a principle of another cooling system provided by the second embodiment of the present application;

| Reference numerals in the FIGS., | |
|---|---|
| 100b housing; | 200b stator iron core; |
| 300b liquid inlet; | 400b liquid outlet; |
| 500b liquid spraying cavity; | 600b liquid spraying hole; |
| 700a first spoiler; | 101b stator casing; |
| 102b upper cover plate; | 103b lower cover plate; |
| 104b intermediate shaft sleeve; | 1011b external port; |

Figure 9:
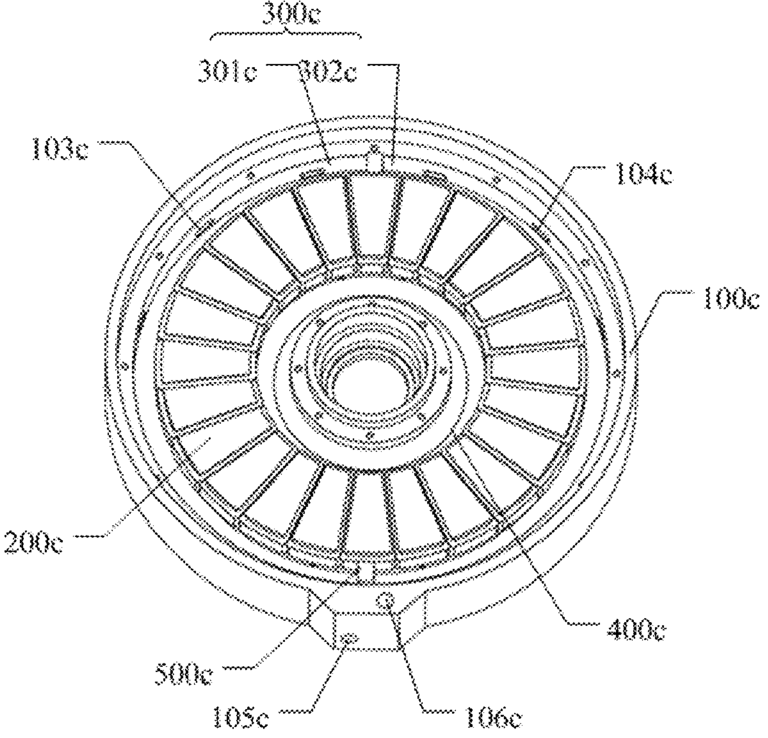
Figure 10:
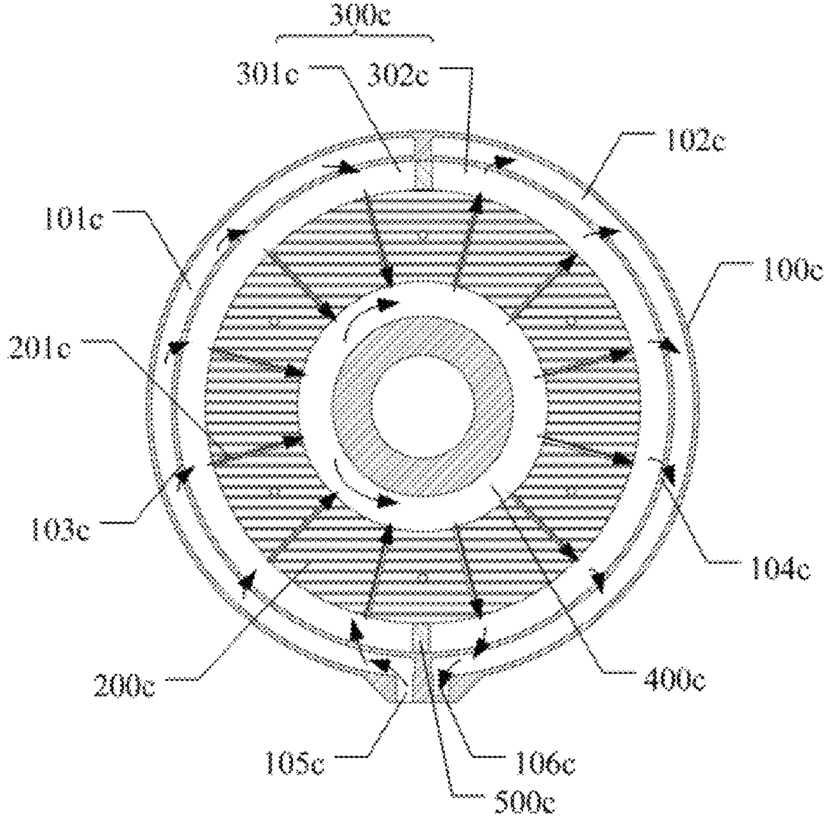
Figure 11:
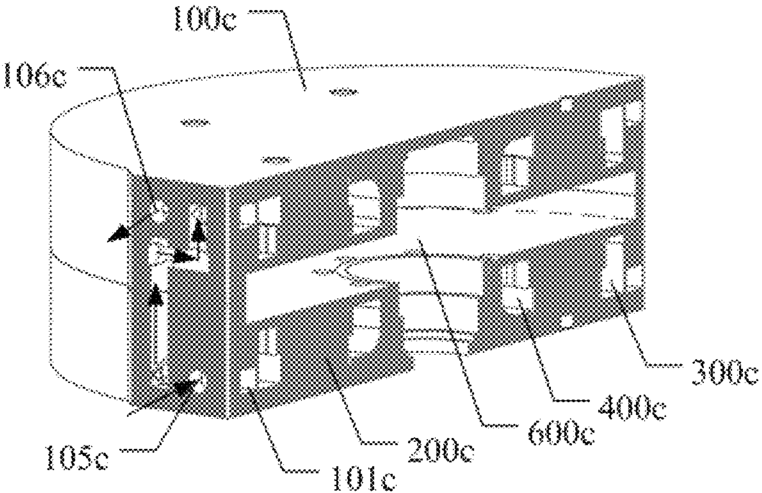
Figure 12:
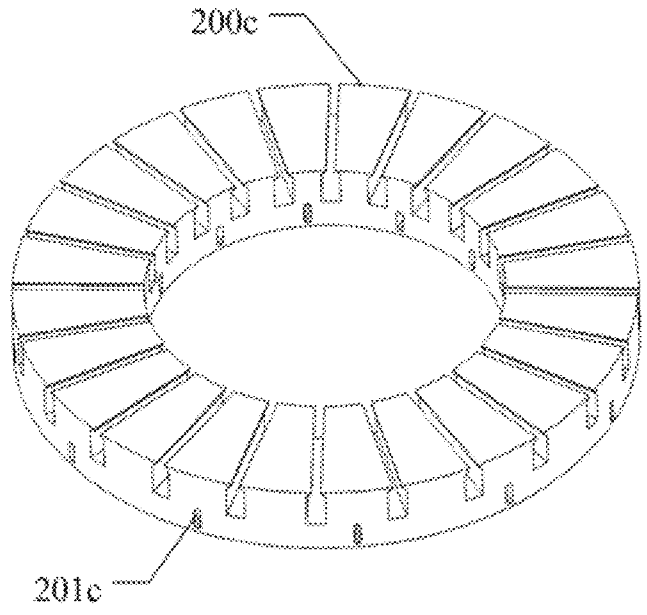
Figure 13:
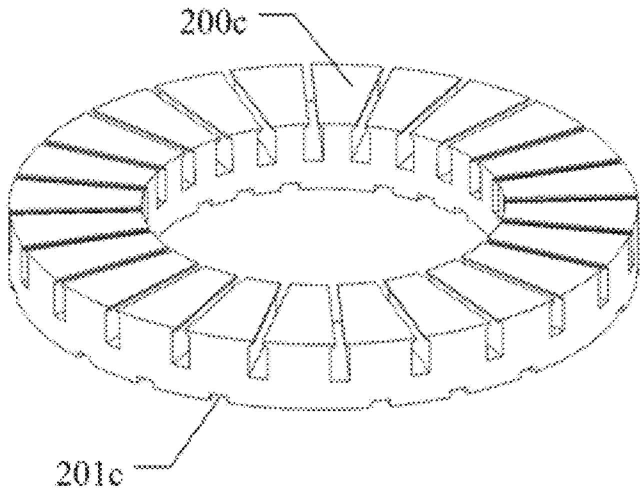
Figure 14:
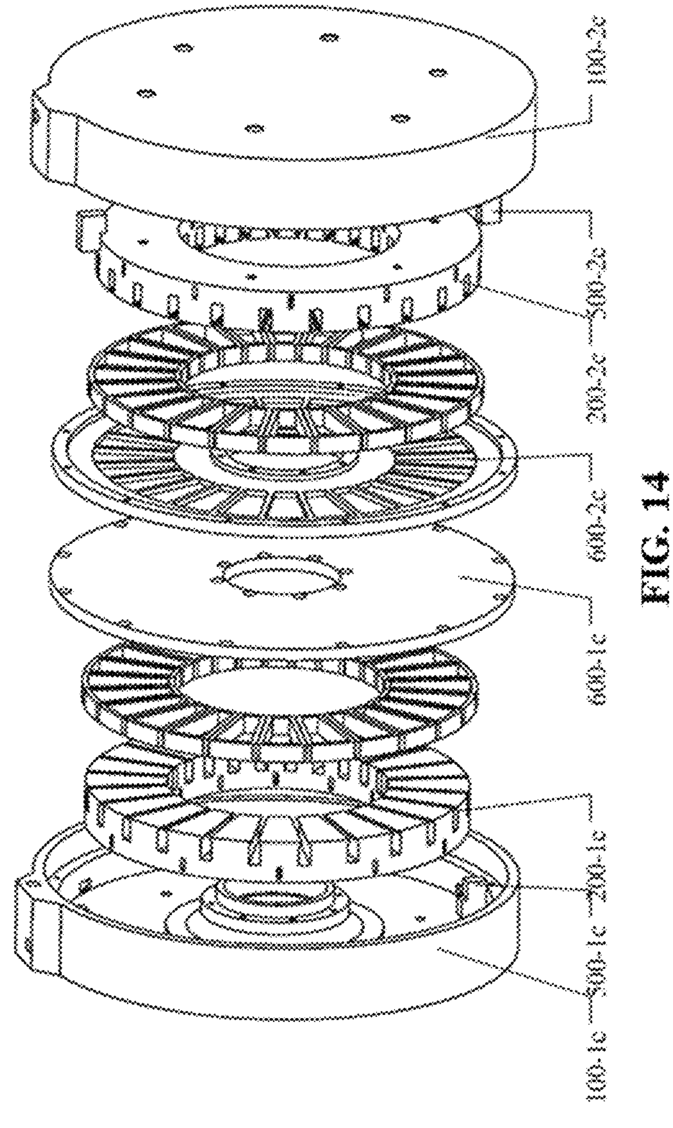

FIG. 9 is a schematic perspective view showing the structure of a stator component provided by a third embodiment of the present application;

FIG. 10 is a schematic sectional view showing the structure of the stator component provided by the third embodiment of the present application;

FIG. 11 is a schematic perspective view of a cross section of the stator component provided by the third embodiment of the present application;

FIG. 12 is a schematic perspective view showing the structure of a stator iron core provided by the third embodiment of the present application;

FIG. 13 is a schematic perspective view showing the structure of another stator iron core provided by the third embodiment of the present application;

FIG. 14 is a schematic exploded view showing the structure of the stator component provided by the third embodiment of the present application;

| Reference numerals in the FIGS., | |
|---|---|
| 100c housing; | 200c stator iron core; |
| 300c first cooling space; | 400c second cooling space; |
| 500c spoiler; | 600c stator pressing plate; |
| 101c liquid inlet cavity; | 102c liquid outlet cavity; |
| 103c first intermediate liquid port; | |
| 104c second intermediate liquid port; | |
| 105c liquid inlet; | 106c liquid outlet; |
| 201c cooling passage; | 301c first cooling area; |
| 302c second cooling area; | |
| 100-1c front housing; | 200-1c front stator iron core; |
| 500-1c front spoiler; | 600-1c front stator pressing plate; |
| 100-2c rear housing; | 200-2c rear stator iron core; |
| 500-2c rear spoiler; | 600-2c rear stator pressing plate; |

Figure 15:
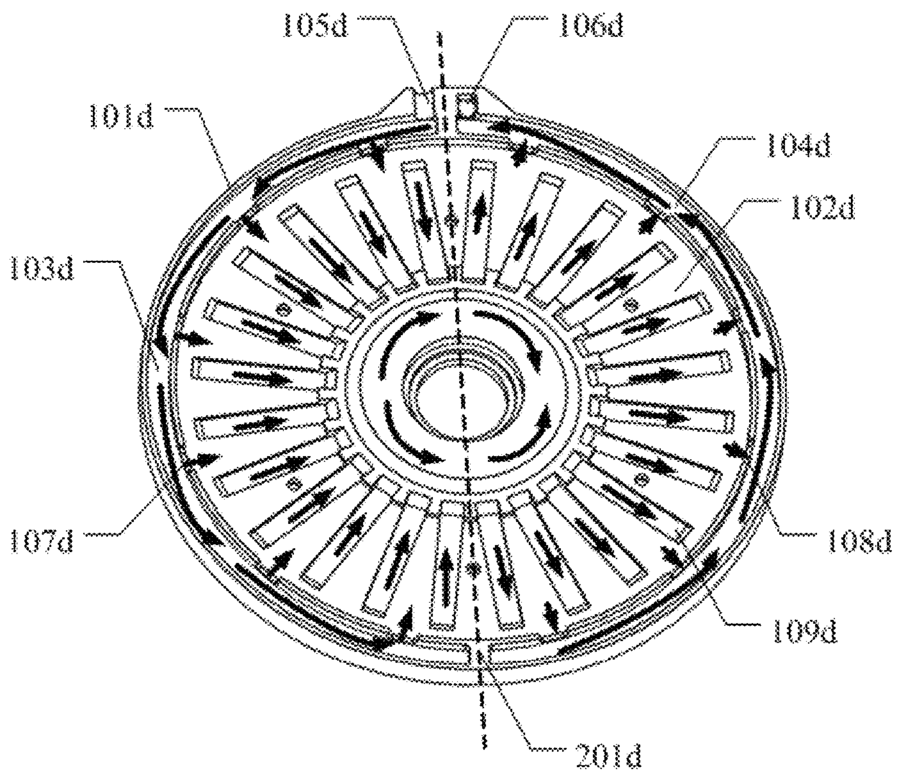
Figure 16:
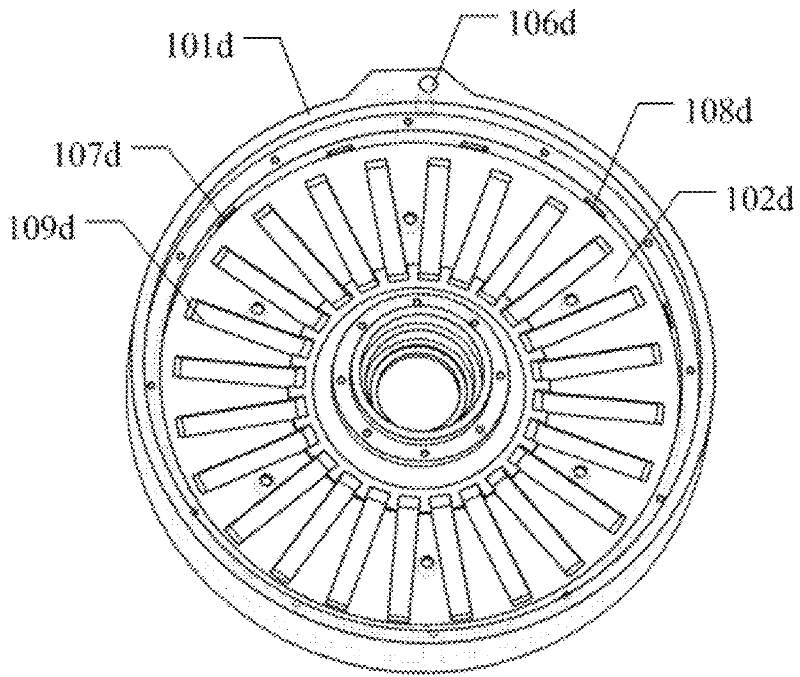
Figure 17:
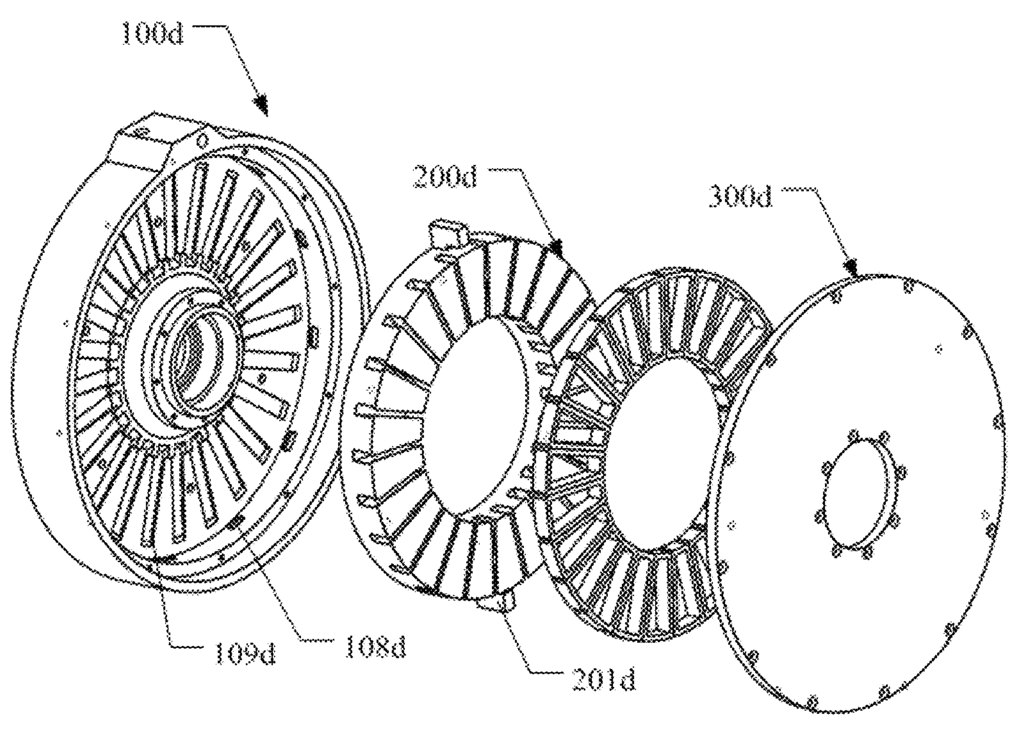
Figure 18:
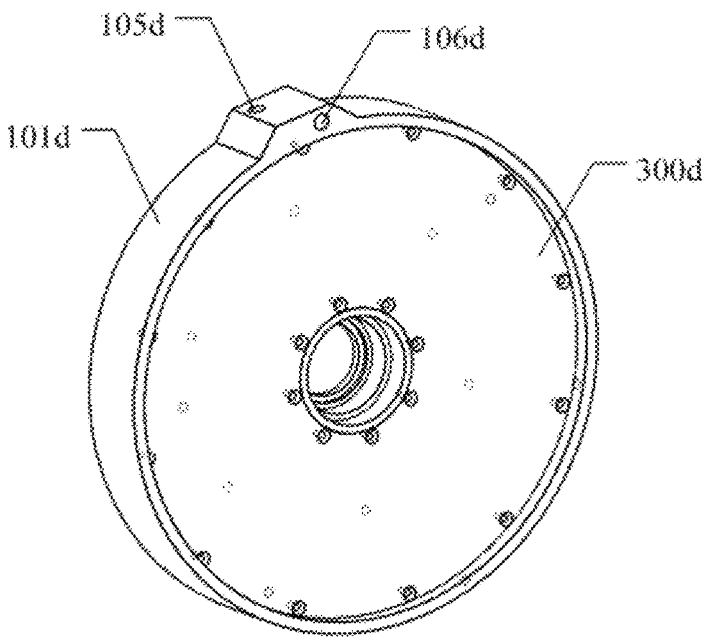
Figure 19:
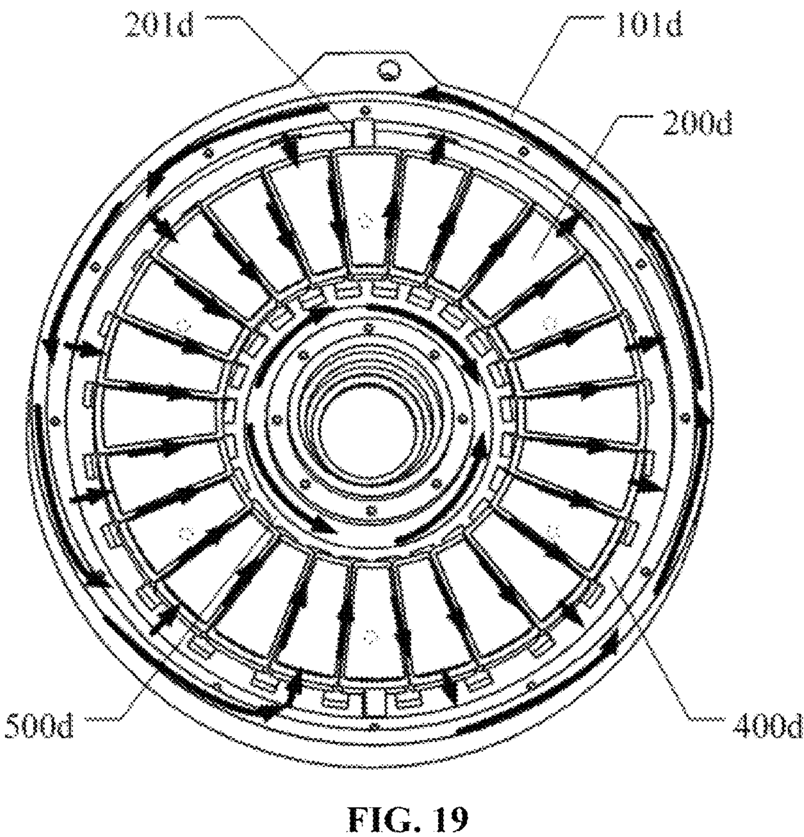
Figure 20:
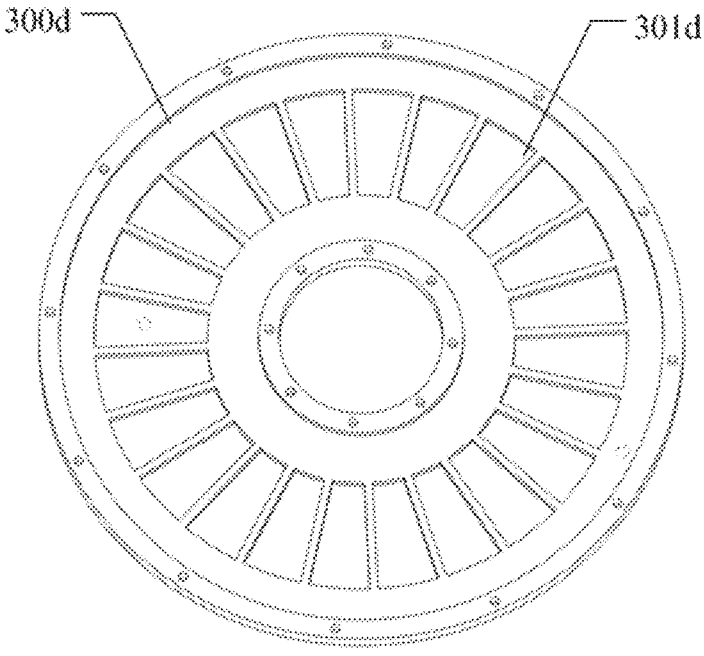

FIG. 15 is a schematic sectional view showing the structure of a cooling system provided by a fourth embodiment of the present application;

FIG. 16 is a schematic perspective view showing the structure of another cooling system provided by the fourth embodiment of the present application;

FIG. 17 is a schematic exploded view showing the structure of a stator component provided by the fourth embodiment of the present application;

FIG. 18 is a schematic perspective view showing the structure of the stator component provided by the fourth embodiment of the present application;

FIG. 19 is a schematic perspective view showing the structure of the stator component provided by the fourth embodiment of the present application;

FIG. 20 is a schematic perspective view showing the structure of a sealing cover plate provided by the forth embodiment of the present application;

| Reference numerals in the FIGS., | |
|---|---|
| 100d cooling system; | 200d stator iron core; |
| 300d sealing cover plate; | 400d first cooling space; |
| 500d second cooling space; | 101d housing; |
| 102d installation position; | 103d oil inlet cavity; |
| 104d oil return cavity; | 105d oil inlet; |
| 106d oil outlet; | 107d oil spraying hole; |
| 108d oil return hole; | 109d oil diverting groove; |
| 201d spoiler; | 301d clamping slot; |

Figure 21:
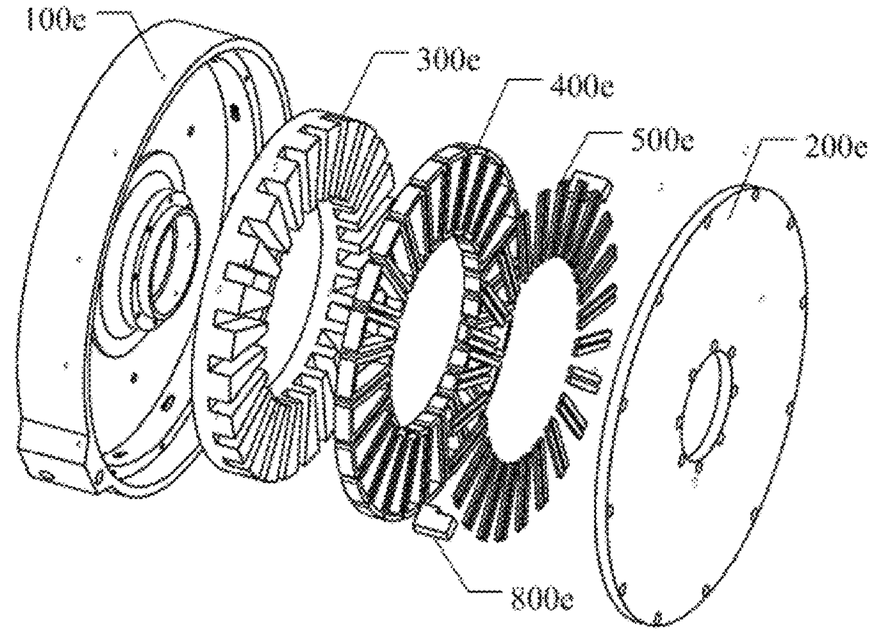
Figure 22:
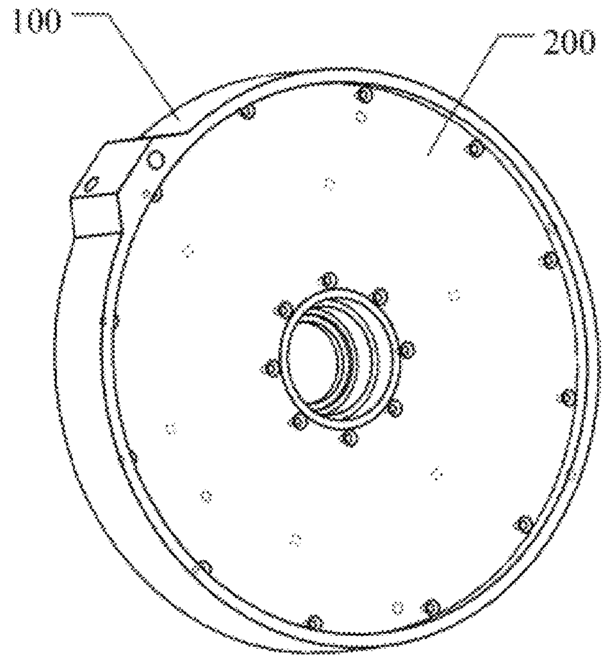
Figure 23:
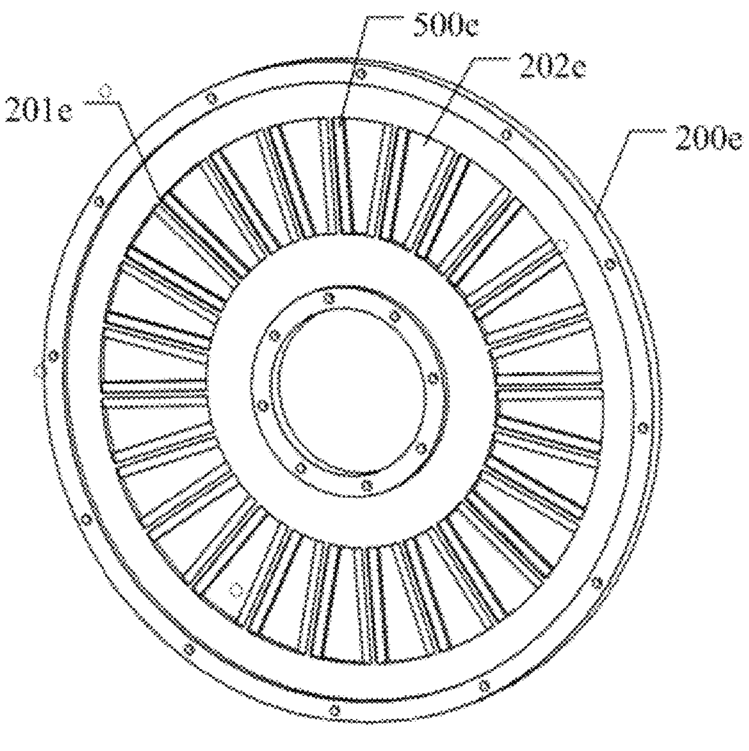
Figure 24:
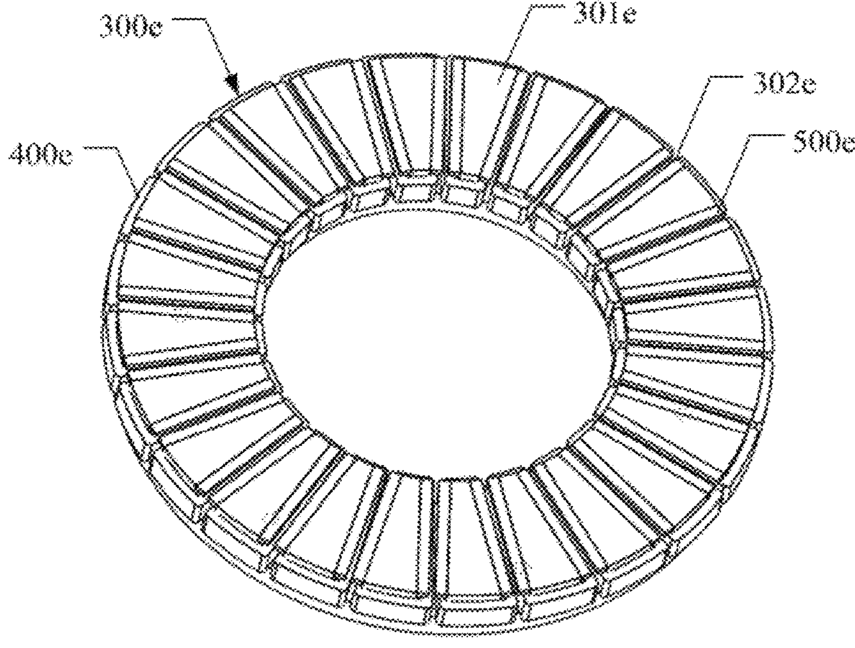
Figure 25:
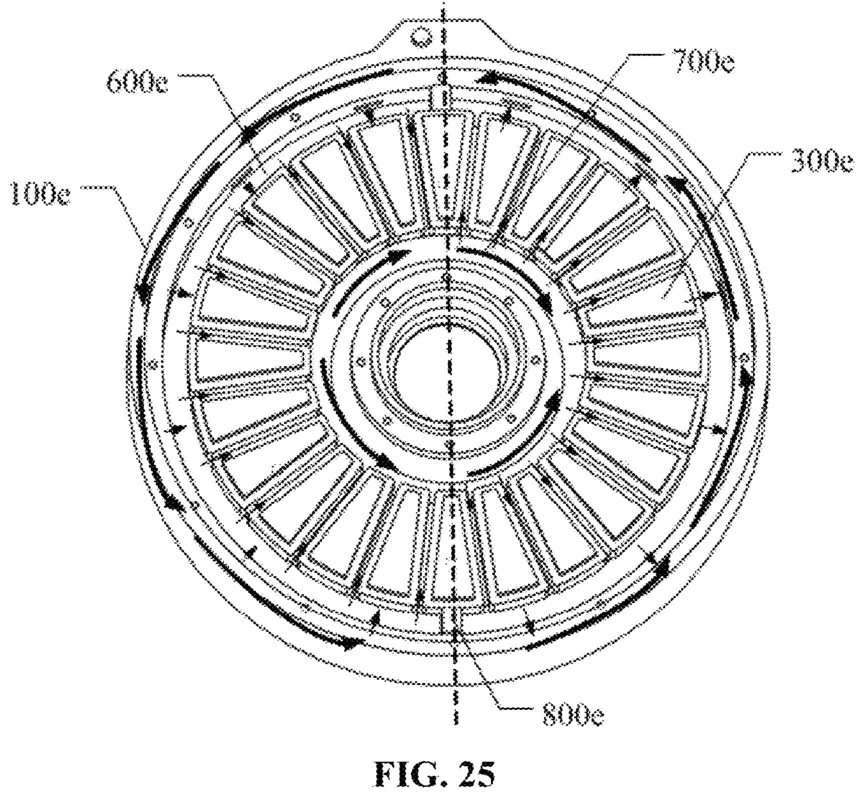
Figure 26:
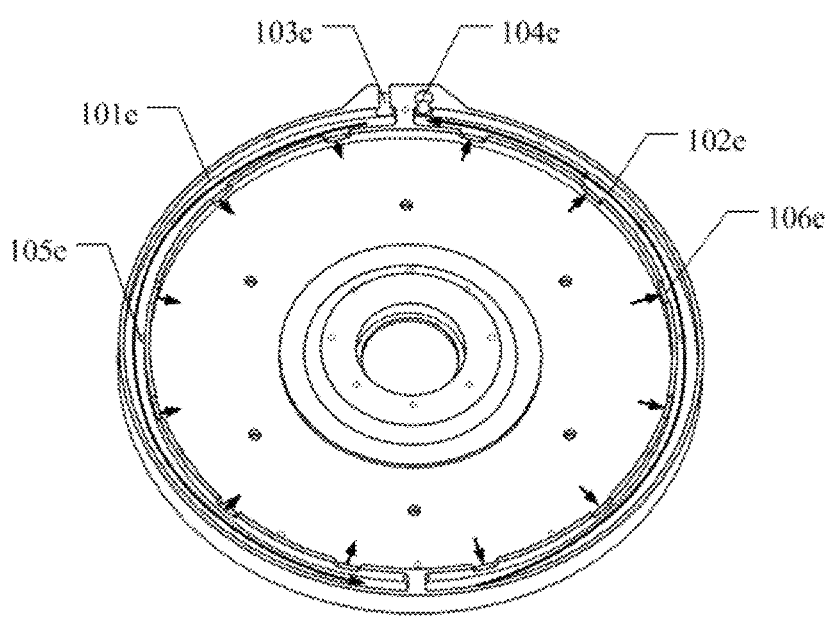

FIG. 21 is a schematic exploded view showing the structure of a stator component provided by a fifth embodiment of the present application;

FIG. 22 is a schematic perspective view showing the structure of the stator component provided by the fifth embodiment of the present application;

FIG. 23 is a schematic structural view of a stator cover plate provided by the fifth embodiment of the present application;

FIG. 24 is a schematic perspective view showing the structure of a stator iron core provided by the fifth embodiment of the present application;

FIG. 25 is a schematic diagram of a cooling principle of the stator iron core provided by the fifth embodiment of the present application;

FIG. 26 is a schematic perspective view showing the structure of a housing provided by the fifth embodiment of the present application;

| Reference numerals in the FIGS., | |
|---|---|
| 100e housing; | 200e stator cover plate; |
| 300e stator iron core; | 400e coil; |
| 500e pole shoe; | 600e first cooling space; |
| 700e second cooling space; | 800e spoiler; |
| 101e oil inlet cavity; | 102e oil return cavity; |
| 103e oil inlet; | 104e oil outlet; |
| 105e oil spraying hole; | 106e oil return hole; |
| 201e groove rib; | 202e iron core tooth groove, |
| 301e tooth, | 302e open slot. |

DETAILED DESCRIPTION OF THE EMBODIMENTS

First Embodiment

A core of the present application is to provide a cooling system and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 1 to 4, a cooling system in the embodiment of the present application is used for cooling a stator iron core 200*a*. The cooling system includes: a housing 100*a*; an enclosed chamber for containing the stator iron core 200*a*; a liquid spraying cavity 500*a* for containing liquid, which is provided on the housing 100*a*; a liquid inlet 300*a* communicating with the liquid spraying cavity 500*a*; a liquid outlet 400*a* communicating with the enclosed chamber; and a liquid spraying component 600*a* provided on an inner wall of the housing 100*a*, which corresponds to the stator iron core 200*a*.

When adopting the cooling system of the present application, liquid enters the liquid spraying cavity 500*a* from the liquid inlet 300*a*, and the liquid is sprayed to the stator iron core 200*a* located in the enclosed chamber through the liquid spraying component 600*a*. After the liquid sprayed from the liquid spraying component 600*a* exchanges heat with the stator iron core 200*a*, it flows out from the liquid outlet 400*a*. Compared with the conventional art, the circulating liquid directly contacts the stator iron core 200*a* to exchange heat, thereby improving the cooling efficiency of the motor and prolonging the service life of the motor.

It should be noted that the housing 100*a* is configured to contain the stator iron core 200*a*, and an enclosed chamber is formed inside. When the stator iron core 200*a* is installed in the enclosed chamber, liquid sprayed by the liquid spraying component 600*a* may circulate through a gap of the coil of the stator iron core 200*a*, and finally flow out from the liquid outlet 400*a*, thereby forming a kind of cooling circulation circuit.

The liquid spraying cavity 500*a* is provided in a housing wall of the housing 100*a*, that is, a section where the liquid spraying cavity 500*a* is provided is a hollow structure. The liquid spraying cavity 500*a* can be adjusted according to a section where the liquid spraying component 600*a* is provided. For example, the housing 100*a* may surround a peripheral surface section of the stator iron core 200*a*, or an end surface section of the housing 100*a* may surround a peripheral surface section of the stator iron core 200*a*. The installation positions of the liquid inlet 300*a* and the liquid outlet 400*a* are further determined according to an installation position of the liquid spraying cavity 500*a*.

The housing 100*a* may have any shape, as long as it is capable of accommodating the liquid spraying cavity 500*a* and the liquid spraying component 600*a*, it is within the protection scope of the present application. In an embodiment of the present application, the housing 100*a* includes:

- a stator casing 101*a* surrounding a circumferential surface of the stator iron core 200*a;*
- an upper cover plate 102*a* and a lower cover plate 103*a* that close two ends of the stator casing 101*a*; and
- an intermediate shaft sleeve 104*a* located in the middle of the stator casing 101*a*, where the stator casing 101*a*, the upper cover plate 102*a*, the lower cover plate 103*a* and the intermediate shaft sleeve 104*a* together define the enclosed chamber.

It can be seen that in the embodiment of the present application, an entirety the housing 100*a* is divided into four sections, and the housing 100*a* may also be divided into three sections according to specific requirements. For example, the upper cover plate 102*a* and the stator casing

101*a* are treated as a one-piece structure, and the lower cover plate 103*a* and the stator casing 101*a* are treated as a one-piece structure. Alternatively, one part of the stator casing 101*a* and the upper cover plate 102*a* are treated as a one-piece structure, and the other part of the stator casing 101*a* and the lower cover plate 103*a* are treated as a one-piece structure, etc.

In order to further improve the cooling efficiency, in another embodiment of the present application, a first spoiler 700*a* is provided on an inner wall of the stator casing 101*a*. An area of the enclosed chamber, which is close to the liquid outlet 400*a*, is separated as a liquid return area by the first spoiler 700*a*, and an area close to the liquid spraying component 600*a* is separated as a liquid spraying area.

Under the action of the first spoiler 700*a*, the enclosed chamber is divided into the liquid return area and the liquid spraying area. The liquid spraying component 600*a* sprays liquid in the liquid spraying area. After the sprayed liquid exchanges heat with the stator iron core 200*a*, it is collected in the liquid return area and flows out through the liquid outlet 400*a*. Therefore, under the action of the first spoiler 700*a*, the liquid sprayed by the liquid spraying component 600*a* can flow uniformly from the outside of the stator iron core 200*a* to the inside, so that the stator iron core 200*a* can be uniformly cooled.

The number of the first spoiler 700*a* may be one or more, as long as the structure is capable of blocking the liquid flow, it is within the protection scope of the present application. In the figure, the number of the first spoiler 700*a* is two, which are respectively located on two sides of the liquid outlet 400*a*. As a result, an area between the two first spoilers 700*a* which is close to the liquid outlet 400*a*, is formed as the liquid return area, and an area between the two first spoilers 700*a* which is away from the liquid outlet 400*a*, is formed as a liquid spraying area. The liquid spraying components 600*a* are all provided on an inner wall of the stator casing 101*a* in the liquid spraying area.

Further, a second spoiler 800*a* is provided at a section close to the liquid outlet 400*a*, of the intermediate shaft sleeve 104*a*. A function of the second spoiler 800*a* is to cause the liquid located inside the stator iron core 200*a* to evenly flow from the inside of the stator iron core 200*a* to the liquid return area, so as to improve the cooling efficiency.

According to the structure of the housing, a liquid spraying cavity 500*a* may be provided on the stator casing 101*a*, the upper cover plate 102*a* or the lower cover plate 103*a*, and accordingly, the liquid inlet 300*a* and the liquid outlet 400*a* may be arranged on the stator casing 101*a*, the upper cover plate 102*a* or the lower cover plate 103*a*. In the embodiment of the present application, the liquid spraying cavity 500*a* is arranged on the stator casing 101*a*, and the liquid inlet 300*a* and/or the liquid outlet 400*a* are arranged on the stator casing 101*a*.

Figure 3:
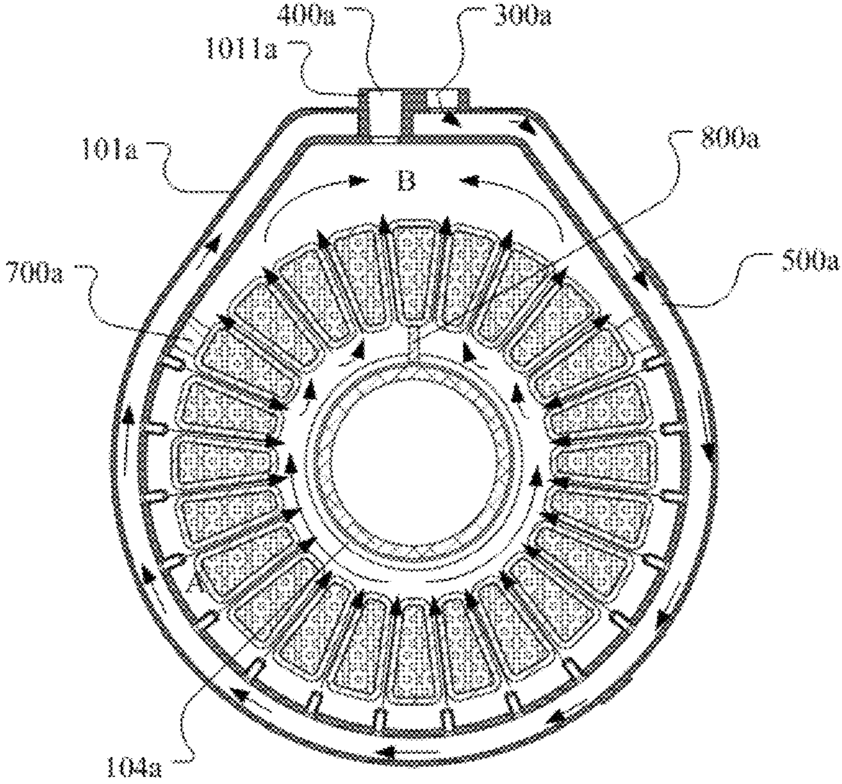
FIG. 3 is a schematic diagram of a principle of the cooling system provided by the first embodiment of the present application.
Figure 4:
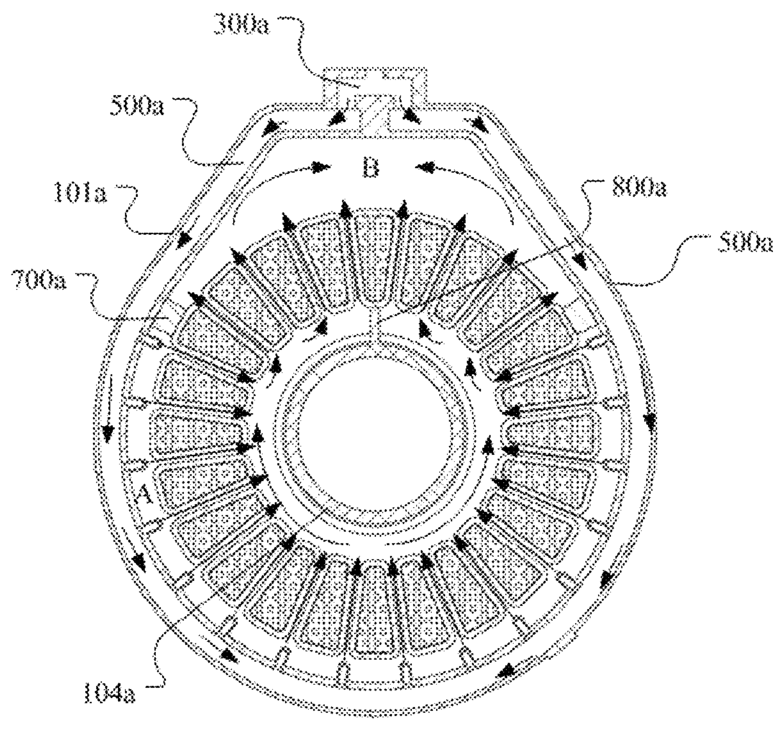
FIG. 4 is a schematic diagram of a principle of another cooling system provided by the first embodiment of the present application.

The liquid spraying cavity 500*a* includes one or two liquid inlets 300*a*. In a case that there is one liquid inlet 300*a*, the liquid inlet is arranged at one end of the liquid spraying cavity 500*a*, as shown in FIG. 3; in a case that there are two liquid inlets 300*a*, the two liquid inlets 300*a* are arranged at two ends of the liquid spraying cavity 500*a*, as shown in FIG. 4.

Two liquid inlets 300*a* are provided, which are respectively located at two ends of the liquid spraying cavity 500*a*, and an external port of the liquid inlet 300*a* has one outlet. Or, there is one liquid inlet 300*a* located at one end of the liquid spraying cavity 500*a*, and a corresponding external port of the liquid inlet 300*a* has one outlet.

In a case that the liquid spraying cavity 500*a* is provided on the stator casing 101*a*, the liquid spraying cavity 500*a* may have a ring-shaped structure that surrounds the entire stator casing 101*a* or a part of the stator casing 101*a*. In order to simplify the processing technology, the liquid inlet 300*a* and the liquid outlet 400*a* are collectively provided on an external port 1011*a* of the first housing 100*a*. Apparently, the external ports 1011*a* of the liquid inlet 300*a* and the liquid outlet 400*a* may be separately provided as needed.

Further, in a case that two liquid inlets 300*a* are provided and the two liquid inlets 300*a* are located at the two ends of the liquid spraying cavity 500*a*, in order to avoid the formation of turbulent flow of the liquid located in the middle, a partition plate is provided in the middle of the liquid spraying cavity 500*a*.

It should be noted that the stator casing 101*a* is a one-piece structure or a split-type structure. The so-called one-piece structure means that when the stator casing 101*a* is processed, the structure of the liquid spraying cavity 500*a* is processed together, for example, in a casting process. In a case that the stator casing 101*a* has a split-type structure, the stator casing 101*a* includes: a stator base housing with a hollow structure and a sealing ring for sealing the hollow structure. The sealing ring and the stator base housing jointly define the liquid spraying cavity 500*a*.

A function of the liquid spraying component 600*a* is to cool the stator iron core 200*a* through spraying. In the embodiment of the present application, the liquid spraying component is a nozzle. The liquid sprayed into the liquid spraying cavity 500*a* has a certain pressure. Under the action of pressure, after the action of the liquid spraying component 600*a*, the sprayed liquid is a fine liquid, thereby increasing the contact area between the liquid and the stator iron core 200*a*. The number of the liquid spraying component 600*a* is one or more, and multiple liquid spraying components 600*a* are capable of further increasing a spray area of the liquid spraying component 600*a*. Further, each liquid spraying component 600*a* corresponds to a coil gap of the stator iron core 200*a*, and each coil gap corresponds to a liquid spraying component. The liquid sprayed by the liquid spraying component can directly contact a heat source, and the cooling effect is better. The liquid can be divided evenly under the action of the first spoiler 700*a* and the second spoiler 800*a*, and the cooling is more uniform, which desirably reduces the temperature of the stator iron core 200*a*.

The present application further discloses a motor, which includes a stator iron core 200*a* and a cooling system, where the cooling system is the cooling system according to any one of the above aspects. Since the above cooling system has the above effects, the motor including the above cooling system also has corresponding effects, which is not repeated here.

In yet another embodiment of the present application, the motor is a radial magnetic field motor or an axial magnetic field motor, and is preferably selected as an axial magnetic field motor.

According to the above description of the disclosed embodiments, those skilled in the art may implement or practice the present application. Various modifications to the embodiments are apparent to those skilled in the art. The general principle defined herein may be implemented in other embodiments without departing from the spirit or scope of the present application. Therefore, the present application should not be limited to the embodiments disclosed herein, but has the widest scope in accordance to the principle and the novel features disclosed herein.

Second Embodiment

A core of the present application is to provide a cooling system and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 5 to 8, a cooling system in the embodiment of the present application is used for cooling a stator iron core 200*b*. The cooling system includes: a housing 100*b*; an enclosed chamber for containing the stator iron core 200*b*; a liquid spraying cavity 500*b* for containing liquid, which is provided on the housing 100*b*; a liquid inlet 300*b* communicating with the liquid spraying cavity 500*b*; a liquid outlet 400*b* communicating with the enclosed chamber; and a liquid spraying hole 600*b* provided on an inner wall of the housing 100*b*, which corresponds to the stator iron core 200*b*.

When adopting the cooling system of the present application, liquid enters the liquid spraying cavity 500*b* from the liquid inlet 300*b*, and the liquid is sprayed to the stator iron core 200*b* located in the enclosed chamber through the liquid spraying hole 600*b*. After the liquid sprayed from the liquid spraying hole 600*b* exchanges heat with the stator iron core 200*b*, it flows out from the liquid outlet 400*b*. Compared with the conventional art, the circulating liquid directly contacts the stator iron core 200*b* to exchange heat, thereby improving the cooling efficiency of the motor and prolonging the service life of the motor.

It should be noted that the housing 100*b* is configured to contain the stator iron core 200*b*, and an enclosed chamber is formed inside. When the stator iron core 200*b* is installed in the enclosed chamber, liquid sprayed by the liquid spraying hole 600*b* may circulate through a gap of the coil of the stator iron core 200*b*, and finally flow out from the liquid outlet 400*b*, thereby forming a kind of cooling circulation circuit.

The liquid spraying cavity 500*b* is provided in a housing wall of the housing 100*b*, that is, a section where the liquid spraying cavity 500*b* is provided is a hollow structure. The liquid spraying cavity 500*b* can be adjusted according to a section where the liquid spraying hole 600*b* is provided. For example, the housing 100*b* may surround a peripheral surface section of the stator iron core 200*b*, or an end surface section of the housing 100*b* may surround a peripheral surface section of the stator iron core 200*b*. The installation positions of the liquid inlet 300*b* and the liquid outlet 400*b* are further determined according to an installation position of the liquid spraying cavity 500*b*.

The housing 100*b* may have any shape, as long as it is capable of accommodating the liquid spraying cavity 500*b* and the liquid spraying component 600*b*, it is within the protection scope of the present application. In an embodiment of the present application, the housing 100*b* includes:

a stator casing 101*b* surrounding a circumferential surface of the stator iron core 200*b;* an upper cover plate 102*b* and a lower cover plate 103*b* that close two ends of the stator casing 101*b*; and an intermediate shaft sleeve 104*b* located in the middle of the stator casing 101*b*, where the stator casing 101*b*, the upper cover plate 102*b*, the lower cover plate 103*b* and the intermediate shaft sleeve 104*b* together define the enclosed chamber.

It can be seen that in the embodiment of the present application, an entirety the housing 100*b* is divided into four sections, and the housing 100*b* may also be divided into three sections according to specific requirements. For example, the upper cover plate 102*b* and the stator casing 101*b* are treated as a one-piece structure, and the lower cover plate 103*b* and the stator casing 101*b* are treated as a one-piece structure. Alternatively, one part of the stator casing 101*b* and the upper cover plate 102*b* are treated as a one-piece structure, and the other part of the stator casing 101*b* and the lower cover plate 103*b* are treated as a one-piece structure, etc.

In order to further improve the cooling efficiency, in another embodiment of the present application, a first spoiler 700*b* is provided on an inner wall of the stator casing 101*b*. An area of the enclosed chamber, which is close to the liquid outlet 400*b*, is separated as a liquid return area by the first spoiler 700*b*, and an area close to the liquid spraying hole 600*b* is separated as a liquid spraying area.

Under the action of the first spoiler 700*b*, the enclosed chamber is divided into the liquid return area and the liquid spraying area. The liquid spraying hole 600*b* sprays liquid in the liquid spraying area. After the sprayed liquid exchanges heat with the stator iron core 200*b*, it is collected in the liquid return area and flows out through the liquid outlet 400*b*. Therefore, under the action of the first spoiler 700*b*, the liquid sprayed by the liquid spraying hole 600*b* can flow uniformly from the outside of the stator iron core 200*b* to the inside, so that the stator iron core 200*b* can be uniformly cooled.

The number of the first spoiler 700*b* may be one or more, as long as the structure is capable of blocking the liquid flow, it is within the protection scope of the present application. In the figure, the number of the first spoiler 700*b* is two, which are respectively located on two sides of the liquid outlet 400*b*. As a result, an area between the two first spoilers 700*b* which is close to the liquid outlet 400*b*, is formed as the liquid return area, and an area between the two first spoilers 700*b* which is away from the liquid outlet 400*b*, is formed as a liquid spraying area. The liquid spraying holes 600*b* are all provided on an inner wall of the stator casing 101*b* in the liquid spraying area.

Further, a second spoiler is provided at a section close to the liquid outlet 400*b*, of the intermediate shaft sleeve 104*b*. A function of the second spoiler is to cause the liquid located inside the stator iron core 200*b* to evenly flow from the inside of the stator iron core 200*b* to the liquid return area, so as to improve the cooling efficiency.

According to the structure of the housing, a liquid spraying cavity 500*b* may be provided on the stator casing 101*b*, the upper cover plate 102*b* or the lower cover plate 103*b*, and accordingly, the liquid inlet 300*b* and the liquid outlet 400*b* may be arranged on the stator casing 101*b*, the upper cover plate 102*b* or the lower cover plate 103*b*. In the embodiment of the present application, the liquid spraying cavity 500*b* is arranged on the stator casing 101*b*, and the liquid inlet 300*b* and/or the liquid outlet 400*b* are arranged on the stator casing 101*b*.

The liquid spraying cavity 500*b* includes one or two liquid inlets 300*b*. In a case that there is one liquid inlet 300*b*, the liquid inlet is arranged at one end of the liquid spraying cavity 500*b*, as shown in FIG. 7; in a case that there are two liquid inlets 300*b*, the two liquid inlets 300*b* are arranged at two ends of the liquid spraying cavity 500*b*, as shown in FIG. 8.

Two liquid inlets 300*b* are provided, which are respectively located at two ends of the liquid spraying cavity 500*b*, and an external port of the liquid inlet 300*b* has one outlet. Or, there is one liquid inlet 300*b* located at one end of the liquid spraying cavity 500*b*, and a corresponding external port of the liquid inlet 300*b* has one outlet.

In a case that the liquid spraying cavity 500*b* is provided on the stator casing 101*b*, the liquid spraying cavity 500*b* may have a ring-shaped structure that surrounds the entire stator casing 101*b* or a part of the stator casing 101*b*. In order to simplify the processing technology, the liquid inlet 300*b* and the liquid outlet 1014*b* are collectively provided on an external port 1011*b* of the first housing 100*b*. Apparently, the external ports 1011*b* of the liquid inlet 300*b* and the liquid outlet 1014*b* may be separately provided as needed.

Further, in a case that two liquid inlets 300*b* are provided and the two liquid inlets 300*b* are located at the two ends of the liquid spraying cavity 500*ba*, in order to avoid the formation of turbulent flow of the liquid located in the middle, a partition plate is provided in the middle of the liquid spraying cavity 500*b*.

It should be noted that the stator casing 101*b* is a one-piece structure or a split-type structure. The so-called one-piece structure means that when the stator casing 101*b* is processed, the structure of the liquid spraying cavity 500*b* is processed together, for example, in a casting process. In a case that the stator casing 101*b* has a split-type structure, the stator casing 101*b* includes: a stator base housing with a hollow structure and a sealing ring for sealing the hollow structure. The sealing ring and the stator base housing jointly define the liquid spraying cavity 500*b*.

A function of the liquid spraying hole 600*b* is to cool the stator iron core 200*b* through spraying. In the embodiment of the present application, the liquid spraying component is a nozzle. The liquid sprayed into the liquid spraying cavity 500*b* has a certain pressure. Under the action of pressure, after the action of the liquid spraying hole 600*b*, the sprayed liquid is a fine liquid, thereby increasing the contact area between the liquid and the stator iron core 200*b*. The number of the liquid spraying hole 600*b* is one or more, and multiple liquid spraying holes 600*b* are capable of further increasing a spray area of the liquid spraying hole 600*b*. Further, each liquid spraying hole 600*a* corresponds to a coil gap of the stator iron core 200*b*, and each coil gap corresponds to a liquid spraying hole. The liquid sprayed by the liquid spraying hole can directly contact a heat source, and the cooling effect is better. The liquid can be divided evenly under the action of the first spoiler 700*b* and the second spoiler, and the cooling is more uniform, which desirably reduces the temperature of the stator iron core 200*b*.

The present application further discloses a motor, which includes a stator iron core 200*b* and a cooling system, where the cooling system is the cooling system according to any one of the above aspects. Since the above cooling system has the above effects, the motor including the above cooling system also has corresponding effects, which is not repeated here.

In yet another embodiment of the present application, the motor is a radial magnetic field motor or an axial magnetic field motor, and is preferably selected as an axial magnetic field motor.

Third Embodiment

A core of the present application is to provide a stator component and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 9 to 14, a stator component in an embodiment of the present application includes a housing 100*c*, and a stator iron core 200*c* provided inside the housing 100*c*; where the stator iron core 200*c* and the housing 100*c* define a first cooling space 300*c*, and a middle portion of the stator iron core 200*c* defines a second cooling space 400*c;* the housing 100*c* is provided with a liquid inlet cavity 101*c* and a liquid outlet cavity 102*c;* a liquid inlet 105*c* communicating with the liquid inlet cavity 101*c* and a liquid outlet 106*c* communicating with the liquid outlet cavity 102*c* are provided on an outer wall of the housing 100*c*; among the multiple housings 100*c*, the liquid outlet 106*c* of the front housing 100*c* is in communication with the liquid inlet 105*c* of the rear housing 100*c;* a first intermediate liquid port 103*c* communicating with the liquid inlet cavity 101*c* and a second intermediate liquid port 104*c* communicating with the liquid outlet cavity 102*c* are provided on an inner wall of the housing 100*c*; and multiple cooling passages 201*c* are provided on the stator iron core 200*c*, and the first cooling space 300*c* and the second cooling space 400*c* are communicated with each other through the cooling passages 201*c*.

When adopting the stator component of the present application, cooling liquid enters the liquid inlet cavity 101*c* from the liquid inlet 105*c*, and enters the first cooling space 300*c* through the first intermediate liquid port 103*c*. Then, the cooling liquid enters the second cooling space 400*c* through the cooling passage 201*c*, and then it enters the first cooling space 300*c* through the cooling passage 201*c*, and then enters the liquid outlet cavity 102*c* through the second intermediate liquid port 104*c*, and finally flows out from the liquid outlet 106*c*. The cooling liquid is capable of directly contacting the stator iron core 200*c* for heat exchange during the process that the cooling liquid flows through the first cooling space 300*c*, the cooling passage 201*c*, and the second cooling space 400*c*, thereby improving the cooling efficiency of the motor and prolonging the service life of the motor.

In order to prevent liquid leakage, in the embodiment of the present application, the stator iron core 200*c* is enclosed, by a stator pressing plate 600*c*, in a space defined by the housing 100*c* and the stator pressing plate 600*c*.

In order to increase the cooling effect, in another embodiment of the present application, a spoiler 500*c* for separating the first cooling space 300*c* is further provided between the housing 100*c* and the stator iron core 200*c*. By providing the spoiler 500*c*, cooling liquid entering the first cooling space 300*c* flows according to a predetermined trajectory, so as to prolong the contact time of the cooling liquid with the stator iron core 200*c*. Further, the spoiler 500*c* is provided so that the cooling liquid can flow through most of the cooling passages 201*c* on the stator iron core 200*c*, so that the temperature on the stator iron core 200*c* is more uniform.

Among them, in the embodiment of the present application, the number of the spoiler 500*c* is two, and the two spoilers 500*c* are arranged symmetrically. The two spoilers 500*c* separate the first cooling space 300*c* into two areas, which are respectively a first cooling area 301*c* and a second cooling area 302*c*, where the first cooling area 301*c* corresponds to the liquid inlet cavity 101*c*, and the second cooling area 302*c* corresponds to the liquid outlet cavity 102*c*. During a cooling process of cooling liquid, the cooling liquid in the liquid inlet cavity 101*c* enters the first cooling area 301*c* through the first intermediate liquid port 103*c*, and the cooling liquid in the first cooling area 301*c* enters the second cooling space 400*c* through the cooling passage 201*c* corresponding to the first cooling area 301*c*. The cooling liquid in the second cooling space enters the second cooling area 302*c* through the cooling passage 201*c* corresponding to the second cooling area 302*c*, and the cooling liquid in the second cooling area 302*c* enters the liquid outlet cavity 102*c* through the second intermediate liquid port 104*c*.

It should be noted that, in the embodiment of the present application, the stator component includes one or more housings 100*c*. In a case that there are multiple housings 100*c*, each housing 100*c* is correspondingly installed with one stator iron core 200*c*. All the multiple housings 100*c* may be two housings 100*c*, three housings 100*c*, four housings 100*c*, and etc. The number of housing 100*c* may be determined according to the output power level.

The multiple housings 100*c* are arranged coaxially, that is, an end face of one housing 100*c* abuts against an end face of an adjacent housing 100*c*.

Among the two housings 100*c*, the liquid outlet 106*c* of one housing 100*c* is in communication with the liquid inlet 105*c* of the other housing 100*c*. The communication may be made through an external pipeline, or the liquid inlet 105*c* of one housing 100*c* and the liquid outlet 106*c* of the other housing 100*c* are coaxially arranged. That is, the liquid outlet 106*c* and the liquid inlet 105*c* are both arranged on the end surface, and when the two housings 100*c* are butted with each other, the liquid outlet 106*c* and the liquid inlet 105*c* are communicated.

Two housings 100*c* are provided by way of example, where the liquid outlet 106*c* of one housing 100*c* is arranged on an end face, and the liquid inlet 105*c* of the other housing 100*c* is arranged on the end face, and when the two housings 100*c* are butted with each other, the liquid outlet 106*c* of the front housing 100*c* is in communication with the liquid inlet 105*c* of the rear housing 100*c*.

Among the multiple housings 100*c*, each of the liquid inlet 105*c* of a housing 100*c* at one end and the liquid outlet 106*c* of the housing 100*c* at the other end may be located on an end surface of a corresponding housing 100*c*, or may be located at a circumferential surface of the corresponding housing 100*c*. Preferably, in order to facilitate the installation of rear parts, in the embodiment of the present application, the liquid inlet 105*c* of the housing 100*c* at one end and the liquid outlet 106*c* of the housing 100*c* at the other end may both be located on a circumferential surface of a corresponding housing 100*c*. Further, the liquid inlet 105*c* of the housing 100*c* at one end and the liquid outlet 106*c* of the housing 100*c* at the other end are both arranged on the same side.

In the embodiment of the present application, a function of the cooling passage 201*c* is a path to communicate the first cooling space 300*c* with the second cooling space 400*c*. Moreover, cooling liquid in the cooling passage 201*c* directly contacts the stator iron core 200*c*, and directly takes heat generated by the stator iron core 200*c* away. Where, the cooling passage 201*c* is a through hole penetrating through the stator iron core 200*c*, and a cross section of the through hole is circular, elliptical, rectangular, etc. Alternatively, the cooling passage 201*c* is encircled by a groove provided on an end surface of the stator iron core 200*c* and the housing 100*c*. It can be understood that, a groove is provided on an end surface of the stator iron core 200*c*, and a corresponding housing 100*c* is a planar structure; the cooling passage 201*c* is encircled by the groove and the surface of the corresponding housing 100*c*; or the stator iron core 200*c* is provided with a groove, a surface of a corresponding housing 100*c* is provided with a groove, and the two grooves are butted to form the cooling passage 201*c*.

In yet another embodiment of the present application, the number of housing 100*c* is two, which are respectively a front housing 100-1*c* and a rear housing 100-2*c*; the number of stator iron core 200*c* is two, which are respectively a front stator iron core 200-1*c* and a rear stator iron core 200-2*c*. Reference is made to the above embodiments for the structure of the front housing 100-1*c* and the rear housing 100-2*c*.

In order to prevent liquid leakage, in the embodiment of the present application, the front stator iron core 200-1*c* is enclosed, by a front stator pressing plate 600-1*c*, in a space defined by the front housing 100-1*c* and the front stator pressing plate 600-1*c*.

A front spoiler 500-1*c* is provided between the front housing 100-1*c* and the front stator iron core 200-1*c*.

In order to prevent liquid leakage, in the embodiment of the present application, the rear stator iron core 200-2*c* is enclosed, by a rear stator pressing plate 600-2*c*, in a space defined by the rear housing 100-2*c* and the rear stator pressing plate 600-2*c*.

A rear spoiler 500-2*c* is provided between the rear housing 100-2*c* and the rear stator iron core 200-2*c*.

The present application further discloses an axial magnetic field motor, which includes the stator component according to any one of the above aspects. Since the above stator component has the above effects, the axial magnetic field motor including the above stator component also has corresponding effects, which is not repeated here.

Fourth Embodiment

A core of the present application is to provide a cooling system, a stator component and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 15 to 20, a cooling system in the embodiment of the present application includes a housing 101*d*, which has an installation position 102*d* at the bottom for installing a stator iron core 200*d*; The cooling system 100*d* further includes:

- an oil inlet cavity 103*d* and an oil return cavity 104*d*, which are provided in the housing 101*d;*
- an oil inlet 105*d* and an oil outlet 106*d*, which are provided on an outer wall of the housing 101*d*, where the oil inlet 105*d* is communicated with the oil inlet cavity 103*d*, and the oil outlet 106*d* is communicated with the oil return cavity 104*d;*
- an oil spraying hole 107*d* and an oil return hole 108*d*, which are provided on an inner wall of the housing

101*d*, where the oil spraying hole 107*d* is communicated with the oil inlet cavity 103*d*, and the oil return hole 108*d* is communicated with the oil return cavity 104*d*; and multiple oil diverting grooves 109*d* provided at the bottom of the housing 101*d*, where the oil diverting grooves 109*d* penetrate through the installation position 102*d*.

When adopting the stator component of the present application, cooling oil enters the oil inlet cavity 103*d* from the oil inlet 105*d*, and enters the inside of the housing 101*d* through the oil spraying hole 107*d*. The cooling oil entering the inside of the housing 101*d* is capable of directly contacting the stator iron core 200*d* provided inside the housing 101*d*, and after the contact heat exchange, the cooling oil enters the oil return cavity 104*d* through the oil return hole 108*d*, and finally flows out from the oil outlet 106*d*. Since the cooling liquid is capable of directly contacting the stator iron core 200*d* for heat exchange, the cooling efficiency of the motor is thereby improved, and the service life of the motor is prolonged.

The cooling system 100*d* includes one or more housings 101*d*. In a case that there are multiple housings 101*d*, the multiple housings 101*d* may be two housings 101*d*, three housings 101*d*, four housings 101*d*, and etc. The number of housing 101*d* may be determined according to the output power level.

The multiple housings 101*d* are arranged coaxially, that is, an end face of one housing 101*d* abuts against an end face of an adjacent housing 100*d*.

Among two adjacent housings 101*d*, the oil outlet 106*d* of the front housing 101*d* is in communication with the oil inlet 105*d* of the rear housing 101*d*. The communication may be made through multiple ways, specifically, may be made through an external pipeline. Alternatively, the oil inlet 105*d* of the front housing 101*d* and the oil outlet 106*d* of the rear housing 101*d* are coaxially arranged. That is, the liquid outlet 106*d* and the liquid inlet 105*d* are both arranged on the end surface, and when the two housings 101*d* are butted with each other, the liquid outlet 106*d* and the liquid inlet 105*d* are communicated.

Two housings 101*d* are provided by way of example, where the oil outlet 106*d* of one housing 101*d* is arranged on an end face, and the oil inlet 105*d* of the other housing 101*d* is arranged on the end face, and when the two housings 101*d* are butted with each other, the oil outlet 106*d* of the front housing 101*d* is in communication with the oil inlet 105*d* of the rear housing 101*d*.

Among the multiple housings 101*d*, each of the oil inlet 105*d* of the housing 101*d* at one end and the oil outlet 106*d* of the housing 101*d* at the other end may be located on an end surface of a corresponding housing 101*d*, or may be located at a circumferential surface of the corresponding housing 101*d*. Preferably, in order to facilitate the installation of rear parts, in the embodiment of the present application, the oil inlet 105*d* of the housing 101*d* at one end and the oil outlet 106*d* of the housing 101*d* at the other end may both be located on a circumferential surface of a corresponding housing 101*d*. Further, the oil inlet 105*d* of the housing 101*d* at one end and the oil outlet 106*d* of the housing 101*d* at the other end are both arranged on the same side.

A stator component is further disclosed by the present application, including a stator iron core 200*d* and the cooling system 100*d* of any one of the above aspects, where the stator iron core 200*d* is arranged on the installation position 102*d* of the housing 101*d* of the cooling system 100*d*, where an outer ring of the stator iron core 200*d* and the housing 101*d* define a first cooling space 400*d*, and an inner ring of the stator iron core 200*d* and the housing 101*d* define a second cooling space 500*d*.

In order to increase the cooling effect, in another embodiment of the present application, a spoiler 201*d* for separating the first cooling space 400*d* is further provided between the housing 101*d* and the stator iron core 200*d*. By providing the spoiler 201*d*, cooling oil entering the first cooling space 400*d* flows according to a predetermined trajectory, so as to prolong the contact time of the cooling oil with the stator iron core 200*d*. Further, the spoiler 201*d* is provided so that the cooling oil can flow through most of the cooling passages 109*d*, so that the temperature on the stator iron core 200*d* is more uniform.

Among them, in the embodiment of the present application, the number of the spoiler 201*d* is two, and the two spoilers 201*d* are arranged symmetrically. The two spoilers 201*d* separate the first cooling space 400*d* into two areas, which are respectively a first cooling area and a second cooling area, where the first cooling area corresponds to the oil inlet cavity 103*d*, and the second cooling area corresponds to the oil outlet cavity 104*d*. During a cooling process of the cooling oil, the cooling oil in the oil inlet cavity 103*d* enters the first cooling area through the oil spraying hole 103*d*, and the cooling oil in the first cooling area enters the second cooling space 500*d* through the oil diverting groove 109*d* corresponding to the first cooling area. The cooling oil in the second cooling space enters the second cooling area through the oil diverting groove 109*d* corresponding to the second cooling area, and the cooling oil in the second cooling area enters the oil return cavity 104*d* through the oil return hole 108*d*.

In the embodiment of the present application, the number of the oil diverting groove 109*d* is plural, and the number of the oil diverting grooves 109*d* is the same as the number of teeth of the stator iron core 200*d*, or may be different. In the embodiment of the present application, the number of the oil diverting grooves 109*d* is the same as the number of teeth of the stator iron core 200*d*.

Further, the oil diverting groove 109*d* corresponds to a coil gap of the stator iron core 200*d*. Since the coil is the main heat-generating component in the stator iron core 200*d*, when the oil diverting groove 109*d* corresponds the coil gap of the stator iron core 200*d*, cooling oil entering the oil diverting groove 109*d* is capable of fully contacting a tooth groove of the stator iron core 200*d*, so that the cooling effect can be further improved.

In order to prevent liquid leakage, in the embodiment of the present application, the stator iron core 200*d* is enclosed, by a sealing cover plate 300*d*, in a space defined by the housing 101*d* and the sealing cover plate 300*d*. Where, the sealing cover plate 300*d* is fixed on the housing 101*d* by screws, other ways such as welding, riveting, or dovetailing may also be used. One end of the sealing cover plate 300*d* close to the stator iron core 200*d* is further provided with a clamping slot 301*d* for clamping the stator iron core.

The present application further discloses an axial magnetic field motor, which includes the stator component according to any one of the above aspects. Since the above stator component has the above effects, the axial magnetic field motor including the above stator component also has corresponding effects, which is not repeated here.

Fifth Embodiment

A core of the present application is to provide a stator component and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 21 to 26, the stator component in the embodiment of the present application includes:

a housing 100*e*, a stator iron core 300*e*, a coil 400*e*, a pole shoe 500*e*, and a stator cover plate 200*e*, where the stator iron core 300*e*, the coil 400*e* and the pole shoe 500*e* are provided in a space defined by the housing 100*e* and the stator cover plate 200*e*; the coil 400*e* is provided in an open slot 302*e* of the stator iron core 300*e*; the pole shoe 500*e* is fixed on the stator cover plate 200*e*, and when the stator cover plate 200*e* is butted with the housing 100*e*, the pole shoe 500*e* can be arranged at a notch of the open slot 302*e*; an outer ring of the stator iron core 300*e* and the housing 100*e* define a first cooling space 600*e*, and an inner ring of the stator iron core 300*e* and the housing 100*e* define a second cooling space 700*e* communicating with the first cooling space 600*e;* a housing wall of the housing 100*e* is provided with an oil inlet cavity 101*e* and an oil return cavity 102*e*, and an outer wall of the housing 100*e* is provided with an oil inlet 103*e* and an oil outlet 104*e*; where the oil inlet 103*e* is communicated with the oil inlet cavity 101*e*, and the oil outlet 104*e* is communicated with the oil return cavity 102*e*; an inner wall of the housing 100*e* is provided with an oil spraying hole 105*e* and an oil return hole 106*e*, and the first cooling space 600*e* and the oil inlet cavity 101*e* are communicated with each other through the oil spraying hole 105*e*, and the first cooling space 600*e* and the oil return cavity 102*e* are communicated with each other through the oil return hole 106*e*.

The stator iron core 300*e* in the present application has an open slot 302*e*, which facilitates the installation of the coil 400*e*. Besides, the pole shoe 500*e* is fixed on the stator cover plate 200*e*. When the stator cover plate 200*e* is butted with the housing 100*e*, the pole shoe 500*e* corresponding to the notch of the open slot 302*e* is capable of reducing the tooth harmonics of the motor, reducing the iron loss of the motor, improving the efficiency of the motor, which may further reduce the torque ripple of the motor. Since the pole shoe 500*e* is carried on the stator cover plate 200*e*, when the stator cover plate 200*e* is directly butted with the housing 100*e* during installation, the pole shoe 500*e* can be matched with the open slot 302*e*, thereby improving the production efficiency of the motor.

When adopting the stator component of the present application, cooling oil enters the oil inlet cavity 101*e* from the oil inlet 103*e*, and enters the inside of the housing 100*e* through the oil spraying hole 105*e*. The cooling oil entering the inside of the housing 100*e* is capable of directly contacting the stator iron core 300*e* provided inside the housing 100*e*, and after the contact heat exchange, the cooling oil enters the oil return cavity 102*e* through the oil return hole 106*e*, and finally flows out from the oil outlet 104*e*. Since the cooling liquid is capable of directly contacting the stator iron core 300*e* for heat exchange, the cooling efficiency of the motor is thereby improved, and the service life of the motor is prolonged.

It should be noted that the stator cover plate 200*e* in the present application is fixed on the housing 100*e* by screws or pressing plate, other ways such as welding, riveting, or dovetailing may also be used. Correspondingly, the stator cover plate 200*e* and the housing 100*e* are provided with mounting holes for mounting screws, a station for setting the pressing plate, riveting holes, and a dovetail structure to realize the fixation of the stator cover plate 200*e* with the housing 100*e*.

The stator iron core 300*e* has an open slot 302*e* and teeth 301*e*. The open slot 302*e* is configured to install the coil 400*e*. There is one open slot 302*e* between each tooth. By providing the open slot 302*e*, the installation of the coil 400*e* may be facilitated, where the coil 400*e* is a formed coil or is wound on the teeth in sequence. The formed coil is a rectangular copper wire formed coil, or a round copper wire pre-wound formed coil.

The stator cover plate 200*e* is generally made of non-magnetic conductive high-strength glass fiber composite material or high-strength plastic (such as PPS, PEEK, etc.). An end surface, close to the stator iron core 300*e*, of the stator cover plate 200*e* is provided with a groove rib 201*e* extending in a radial direction of the stator cover plate 200*e* and an iron core tooth groove 202*e* corresponding to the stator iron core 300*e*. The position alignment of the stator cover plate 200*e* with the housing 100*e* may be facilitated by providing the groove rib 201*e* and the iron core tooth groove 202*e*. The number of groove rib 201*e* is the same as or different from the number of open slot 302*e*. The number of groove rib 201*e* is equal to the number of open slot 302*e* of the stator iron core 300*e*, which can facilitate the position alignment of the stator cover plate 200*e* with the housing 100*e*. One pole shoe 500*e* is provided on two sides of each groove rib 201*e*, that is, the pole shoe 500*e* is pasted on two sides of the groove rib 201*e*, and the remaining iron core tooth groove 202*e* is fitted to tooth surfaces of the whole iron core. A thickness of the cover plate at a tooth groove section of the iron core tooth needs to be as thin as possible to reduce an air gap between the stator and a rotor.

Each stator component has one housing. Multiple stator components may be coaxially arranged, and multiple housings 100*e* are arranged coaxially, that is, an end face of one housing 100*e* abuts against an end face of an adjacent housing 100*d*.

Among two adjacent housings 100*e*, the oil outlet 104*e* of the front housing 100*e* is in communication with the oil inlet 103*e* of the rear housing 100*e*. The communication may be made through multiple ways, specifically, may be made through an external pipeline.

Alternatively, the oil inlet 103*e* of the front housing 100*e* and the oil outlet 104*e* of the rear housing 100*e* are coaxially arranged. That is, the liquid outlet 104*e* and the liquid inlet 103*e* are both arranged on the end surface, and when the two housings 100*e* are butted with each other, the liquid outlet 104*e* and the liquid inlet 103*e* are communicated.

Two housings 100*e* are provided by way of example, where the oil outlet 104*e* of one housing 100*e* is arranged on an end face, and the oil inlet 103*e* of the other housing 100*e* is arranged on the end face, and when the two housings 100*e* are butted with each other, the oil outlet 104*e* of the front housing 100*e* is in communication with the oil inlet 103*e* of the rear housing 100*e*.

Among the multiple housings 100*e*, each of the oil inlet 103*e* of the housing 100*e* at one end and the oil outlet 104*e* of the housing 100*e* at the other end may be located on an end surface of a corresponding housing 100*e*, or may be located at a circumferential surface of the corresponding housing 100*e*. Preferably, in order to facilitate the installation of rear parts, in the embodiment of the present application, the oil inlet 103*e* of the housing 100*e* at one end and the oil outlet 104*e* of the housing 100*e* at the other end may both be located on a circumferential surface of a corresponding housing 100*e*. Further, the oil inlet 103*e* of the housing 100*e* at one end and the oil outlet 104*e* of the housing 100*e* at the other end are both arranged on the same side.

In an embodiment of the present application, the pole shoe 500*e* extends along a length direction of the stator cover plate 200*e*. In a radial direction of the stator cover plate 200*e*, the length of the pole shoe 500*e* is the same as the length of the notch of the open slot 302*e*.

In an embodiment of the present application, a sum of widths of the groove rib 201*e* and the pole shoe 500*e* located on the two sides of the groove rib 201*e* equals to a width of the notch of the open slot 302*e*.

The pole shoe 500*e* is molded from SMC ferromagnetic powder or other magnetic conductive powder (e.g., ferrite powder), and has a rectangular shape.

The present application further discloses an axial magnetic field motor, which includes the stator component according to any one of the above aspects. Since the above stator component has the above effects, the axial magnetic field motor including the above stator component also has corresponding effects, which is not repeated here.

According to the above description of the disclosed embodiments, those skilled in the art may implement or practice the present application. Various modifications to the embodiments are apparent to those skilled in the art. The general principle defined herein may be implemented in other embodiments without departing from the spirit or scope of the present application. Therefore, the present application should not be limited to the embodiments disclosed herein, but has the widest scope in accordance to the principle and the novel features disclosed herein.

The invention claimed is:

1. A cooling system, comprising a housing, wherein a bottom of the housing has an installation position for installing a stator iron core; the cooling system further comprises:
- an oil inlet cavity and an oil return cavity, which are provided in the housing; an oil inlet and an oil outlet, which are provided on an outer wall of the housing, wherein the oil inlet is communicated with the oil inlet cavity, and the oil outlet is communicated with the oil return cavity;
- an oil spraying hole and an oil return hole, which are provided on an inner wall of the housing, wherein the oil spraying hole is communicated with the oil inlet cavity, and the oil return hole is communicated with the oil return cavity; and
- a plurality of oil diverting grooves provided at the bottom of the housing, wherein the oil diverting grooves penetrate through the installation position.

2. The cooling system according to claim 1, wherein the number of the housing is plural, two adjacent housings of the plurality of housings comprise a front housing and a rear housing, and the oil outlet of the front housing is communicated with the oil inlet of the rear housing.

3. The cooling system according to claim 2, wherein the oil inlet of the front housing is arranged coaxially with the oil outlet of the rear housing.

4. A stator component, comprising a stator iron core and the cooling system according to claim 1, wherein the stator iron core is provided on an installation position of the housing of the cooling system; an outer ring of the stator iron core and the housing define a first cooling space, and an inner ring of the stator iron core and the housing define a second cooling space.

5. The stator component according to claim 4, wherein a spoiler for separating the first cooling space is further provided between the housing and the stator iron core.

6. The stator component according to claim 5, wherein the number of the spoiler is two, the two spoilers are arranged symmetrically, the two spoilers separate the first cooling space into a first cooling area and a second cooling area, wherein the first cooling area is communicated with the oil inlet cavity through the oil spraying hole, and the second cooling area is communicated with the oil outlet cavity through the oil return hole.

7. The stator component according to claim 6, wherein the stator iron core is enclosed, by a sealing cover plate, in a space defined by the housing and the sealing cover plate.

8. The stator component according to claim 4, wherein the stator iron core comprises a plurality of teeth, and a number of the oil diverting grooves equals to a number of the teeth of the stator iron core.

9. The stator component according to claim 8, wherein the oil diverting grooves correspond to teeth grooves of the stator iron core.

10. An axial magnetic field motor, comprising the stator component according to claim 4.

11. A stator component comprising a housing, a stator iron core, a coil, a pole shoe, and a stator cover plate, wherein the stator iron core, the coil and the pole shoe are provided in a space defined by the housing and the stator cover plate; the coil is provided in an open slot of the stator iron core, wherein the pole shoe is fixed on the stator cover plate, and when the stator cover plate is butted with the housing, the pole shoe can be arranged at a notch of the open slot; an outer ring of the stator iron core and the housing define a first cooling space, and an inner ring of the stator iron core and the housing define a second cooling space communicating with the first cooling space; a housing wall of the housing is provided with an oil inlet cavity and an oil return cavity, and an outer wall of the housing is provided with an oil inlet and an oil outlet; wherein the oil inlet is communicated with the oil inlet cavity, and the oil outlet is communicated with the oil return cavity; an inner wall of the housing is provided with an oil spraying hole and an oil return hole, and the first cooling space and the oil inlet cavity are communicated with each other through the oil spraying hole, and the first cooling space and the oil return cavity are communicated with each other through the oil return hole.

12. The stator component according to claim 11, wherein the stator cover plate is fixed on the housing by screws, pressing plate, welding, riveting, or dovetailing.

13. The stator component according to claim 12, wherein an end surface, close to the stator iron core, of the stator cover plate is provided with a groove rib extending in a radial direction of the stator cover plate and an iron core tooth groove corresponding to the stator iron core.

14. The stator component according to claim 13, wherein the number of the groove rib is equal to the number of the open slot of the stator iron core, and the pole shoe is provided on two sides of each groove rib.

15. The stator component according to claim 13, wherein the pole shoe extends along a length direction of the stator cover plate, and in a radial direction of the stator cover plate, the length of the pole shoe is the same as the length of the notch of the open slot.

16. The stator component according to claim 13, wherein a sum of widths of the groove rib and the pole shoe located on the two sides of the groove rib equals to a width of the notch of the open slot.

17. The stator component according to claim 16, wherein the pole shoe is made of SMC.

18. The stator component according to claim 11, wherein the stator cover plate is made of non-magnetic conductive high-strength glass fiber composite material or high-strength plastic.

19. The stator component according to claim 11, wherein the coil is a formed coil.

20. An axial magnetic field motor, comprising the stator component according to claim 11.

* * * * *